United States Patent [19]
Ballard

[11] Patent Number: 5,910,988
[45] Date of Patent: Jun. 8, 1999

[54] REMOTE IMAGE CAPTURE WITH CENTRALIZED PROCESSING AND STORAGE

[75] Inventor: Claudio R. Ballard, Lloyd Harbor, N.Y.

[73] Assignee: CSP Holdings, Inc., Lloyd Harbor, N.Y.

[21] Appl. No.: 08/917,761

[22] Filed: Aug. 27, 1997

[51] Int. Cl.⁶ .................................................. H04L 9/00
[52] U.S. Cl. ............................................................ 380/24
[58] Field of Search ........................................ 380/25, 24

[56] References Cited

U.S. PATENT DOCUMENTS

| | | | |
|---|---|---|---|
| 4,201,978 | 5/1980 | Nally | 340/146.3 |
| 4,264,808 | 4/1981 | Owens et al. | 235/379 |
| 4,326,258 | 4/1982 | de la Guardia | 364/515 |
| 4,417,136 | 11/1983 | Rushby et al. | 235/379 |
| 4,457,015 | 6/1984 | Nally et al. | 382/45 |
| 4,500,750 | 2/1985 | Elander et al. | 380/26 |
| 4,523,330 | 6/1985 | Cain | 382/7 |
| 4,555,617 | 11/1985 | Brooks et al. | 235/379 |
| 4,578,530 | 3/1986 | Zeidler | 380/26 |
| 4,602,936 | 7/1986 | Green et al. | 382/140 |
| 4,680,803 | 7/1987 | Dilella | 382/9 |
| 4,694,147 | 9/1987 | Amemiya et al. | 235/379 |
| 4,747,058 | 5/1988 | Ho | 364/478 |
| 4,750,201 | 6/1988 | Hodgson et al. | 379/144 |
| 4,843,220 | 6/1989 | Haun | 235/380 |
| 4,888,812 | 12/1989 | Dinan et al. | 382/7 |
| 4,912,762 | 3/1990 | Lee et al. | 380/24 |
| 4,926,325 | 5/1990 | Benton et al. | 364/408 |
| 4,960,981 | 10/1990 | Benton et al. | 235/379 |
| 5,091,968 | 2/1992 | Higgins et al. | 382/30 |
| 5,122,950 | 6/1992 | Benton et al. | 364/408 |
| 5,144,115 | 9/1992 | Yoshida | 235/379 |
| 5,159,548 | 10/1992 | Caslavka | 364/408 |
| 5,173,594 | 12/1992 | McClure | 235/380 |
| 5,175,682 | 12/1992 | Higashiyama et al. | 364/408 |
| 5,187,750 | 2/1993 | Behera | 382/7 |
| 5,204,811 | 4/1993 | Bednar et al. | 364/406 |
| 5,220,501 | 6/1993 | Lawlor et al. | 364/408 |
| 5,237,158 | 8/1993 | Kern et al. | 235/379 |
| 5,274,567 | 12/1993 | Kallin et al. | 364/478 |
| 5,283,829 | 2/1994 | Anderson | 380/24 |
| 5,321,238 | 6/1994 | Kamata et al. | 235/379 |
| 5,321,751 | 6/1994 | Ray et al. | 380/23 |
| 5,345,090 | 9/1994 | Hludzinski | 250/566 |
| 5,434,928 | 7/1995 | Wagner et al. | 382/187 |
| 5,436,970 | 7/1995 | Ray et al. | 380/23 |
| 5,444,794 | 8/1995 | Uhland, Sr. | 382/137 |
| 5,457,747 | 10/1995 | Drexler et al. | 380/24 |
| 5,479,510 | 12/1995 | Olsen et al. | 380/24 |
| 5,506,691 | 4/1996 | Bednar et al. | 358/402 |
| 5,544,043 | 8/1996 | Miki et al. | 364/406 |

(List continued on next page.)

*Primary Examiner*—Salvatore Cangialosi
*Attorney, Agent, or Firm*—McGuire, Woods, Battle & Boothe LLP

[57] ABSTRACT

A system for remote data acquisition and centralized processing and storage is disclosed called the DataTreasury™ System. The DataTreasury™ System provides comprehensive support for the processing of documents and electronic data associated with different applications including sale, business, banking and general consumer transactions. The system retrieves transaction data at one or more remote Locations, encrypts the data, transmits the encrypted data to a central location, transforms the data to a usable form, performs identification verification using signature data and biometric data, generates informative reports from the data and transmits the informative reports to the remote location (s). The DataTreasury™ System has many advantageous features which work together to provide high performance, security, reliability, fault tolerance and low cost. First, the network architecture facilitates secure communication between the remote location(s) and the central processing facility. A dynamic address assignment algorithm performs load balancing among the system's servers for faster performance and higher utilization. Finally, a partitioning scheme improves the error correction process.

50 Claims, 10 Drawing Sheets

U.S. PATENT DOCUMENTS

| | | | |
|---|---|---|---|
| 5,590,038 | 12/1996 | Pitroda | 395/241 |
| 5,602,933 | 2/1997 | Blackwell et al. | 382/116 |
| 5,604,640 | 2/1997 | Zipf et al. | 359/803 |
| 5,613,001 | 3/1997 | Bakhoum | 380/4 |
| 5,647,017 | 7/1997 | Smithies et al. | 382/119 |
| 5,657,389 | 8/1997 | Houvener | 380/23 |
| 5,657,396 | 8/1997 | Rudolph et al. | 382/190 |
| 5,673,333 | 9/1997 | Johnston | 382/137 |
| 5,751,842 | 5/1998 | Riach et al. | 382/137 |
| 5,754,673 | 5/1998 | Brooks et al. | 382/112 |
| 5,781,654 | 7/1998 | Carney | 382/137 |
| 5,784,503 | 7/1998 | Bleecker, III et al. | 382/306 |
| 5,787,403 | 7/1998 | Randle | 705/43 |

REMOTE IMAGE CAPTURE WITH CENTRALIZED PROCESSING AND STORAGE

FIELD OF THE INVENTION

This invention relates generally to the automated processing of documents and electronic data from different applications including sale, business, banking and general consumer transactions. More particularly, it pertains to an automated system to retrieve transaction data at remote locations, to encrypt the data, to transmit the encrypted data to a central location, to transform the data to a usable form, to generate informative reports from the data and to transmit the informative reports to the remote locations.

BACKGROUND

This invention involves the processing of documents and electronic data which are generated, for example, from sale, business and banking transactions including credit card transactions, smart card transactions, automated teller machine (ATM) transactions, consumer purchases, business forms, W2 forms, birth certificates, deeds and insurance documents.

The enormous number of paper and electronic records generated from documents and electronic data from sale, business and banking transactions contain valuable information. First, these paper and electronic records contain information which can be used to verify the accuracy of the records maintained by consumers, merchants and bankers. For example, customers use paper receipts of sale and banking transactions to verify the information on the periodic statements which they receive from their bank or credit card institution. Merchants use paper receipts to record sale transactions for management of customer complaints. Taxpayers use paper receipts to record tax deductible contributions for use in their tax return preparation. Employees use paper receipts to record business expenses for preparation of business expense forms.

Paper and electronic records also contain information which can be used for market analysis. For example, manufacturers and retailers can determine consumer preferences in different regions as well as trends in consumer preferences from the information contained in paper and electronic records.

However, the maintenance and processing of paper and electronic records presents difficult challenges. First, paper receipts and documents could easily be lost, misplaced, stolen, damaged or destroyed. Further, the information contained in these paper and electronic records cannot be easily processed because it is scattered among individual records. For example, the market trend information contained in a group of sales records retained by merchants cannot easily be determined since this information is scattered among the individual records. Likewise, the tax information contained in a group of paper receipts of sales transactions retained by consumers cannot easily be processed.

Previous approaches have been proposed to meet the challenges associated with the maintenance and processing of paper and electronic records. For example, data archive service companies store the information from paper receipts and documents acquired from their customers on microfilm or compact disc read only memory (CD-ROM) at a central facility. Customers typically deliver the paper receipts and documents to the central facility. For sensitive documents which cannot leave the customer site, some data archive service companies perform data acquisition and transfer to magnetic tapes at the customer site and deliver the tapes to the central facility.

The approach offered by these data archive service companies have disadvantages. First, the approach is costly and has poor performance because it requires an expensive, time consuming physical transportation of paper receipts or magnetic tapes from the customer site to the central facility. Further, the approach is not reliable as information can be lost or damaged during physical transportation. The approach also has limited capability as it does not process electronic records along with the paper receipts within a single system.

Other approaches have focused on the elimination of paper receipts and documents. U.S. Pat. No. 5,590,038 discloses a universal electronic transaction card (UET card) or smart card which stores transaction information on a memory embedded on the card as a substitute for a paper receipt. Similarly, U.S. Pat. No. 5,479,510 discloses a method of electronically transmitting and storing purchaser information at the time of purchase which is read at a later time to ensure that the purchased goods or services are delivered to the correct person.

While these approaches avoid the problems associated with paper receipts, they have other disadvantages. First, these approaches do not offer independent verification of the accuracy of the records maintained by consumers, merchants and bankers with a third party recipient of the transaction data. For example, if a UET card is lost, stolen, damaged or deliberately altered by an unscrupulous holder after recording sale or banking transactions, these approaches would not be able to verify the remaining records which are maintained by the other parties to the transactions.

Next, these approaches do not have the ability to process both paper and electronic records of transactions within a single, comprehensive system. Accordingly, they do not address the task of processing the enormous number of paper receipts which have been generated from sales and banking transactions. The absence of the ability to process both paper and electronic records of these approaches is a significant limitation as paper receipts and documents will continue to be generated for the foreseeable future because of concerns over the reliability and security of electronic transactions and the familiarity of consumers and merchants with paper receipts.

These approaches also have a security deficiency as they do not offer signature verification which is typically used on credit card purchases to avoid theft and fraud. For example, a thief could misappropriate money from a UET card holder after obtaining by force, manipulation or theft the user's personal identification number (PIN). Similarly, it is not uncommon for criminals to acquire credit cards in victims' names and make unlawful charges after obtaining the victim's social security number. This becomes a greater concern as that type of personal information becomes available, e.g., on the internet. Also, the signature verification performed manually by merchants for credit card purchases frequently misses forged signatures.

Even if smart cards or UET cards had the ability to store signature and other biometric data within the card for verification, the system would still have disadvantages. First, the stored biometric data on the card could be altered by a card thief to defeat the security measure. Similarly, the biometric data could be corrupted if the card is damaged. Finally, the security measure would be costly at it would require an expensive biometric comparison feature either on each card or on equipment at each merchant site.

Additional biometric verification systems including signature verification systems have been proposed to address the security problem. For example, U.S. Pat. No. 5,657,393 discloses a method and apparatus for verification of handwritten signatures involving the extraction and comparison of signature characteristics including the length and angle of select component lines. In addition, U.S. Pat. No. 5,602,933 discloses a method and apparatus for the verification of remotely acquired data with corresponding data stored at a central facility.

However, none of these verification systems offer general support for transaction initiation, remote paper and electronic data acquisition, data encryption, data communication, data archival, data retrieval, data mining, manipulation and analytic services. Accordingly, there is a need for a single system which offers comprehensive support for the tasks involved in the automated processing of documents, biometric and electronic data from sale, business, banking and general consumer transactions. Further, there is a need for a single comprehensive system having the reliability, performance, fault tolerance, capacity, cost and security to satisfy the requirements of the retail, business, banking and general consumer industries.

SUMMARY OF THE INVENTION

The invention provides an automated, reliable, high performance, fault tolerant, and low cost system with maximal security and availability to process electronic and paper transactions, and has been named the DataTreasury™ System.

It is an object of the present invention to provide a system for central management, storage and verification of remotely captured electronic and paper transactions from credit cards, smart cards, debit cards, documents and receipts involving sales, business, banking and general purpose consumer applications comprising:

- at least one remote data access subsystem for capturing and sending electronic and paper transaction data;
- at least one data collecting subsystem for collecting and sending the electronic and paper transaction data comprising a first data management subsystem for managing the collecting and sending of the transaction data;
- at least one central data processing subsystem for processing, sending and storing the electronic and paper transaction data comprising a second data management subsystem for managing the processing, sending and storing of the transaction data; and
- at least one communication network for the transmission of the transaction data within and between said at least one data access subsystem and said at least one data processing subsystem.

The DataTreasury™ System processes paper and/or electronic receipts such as credit card receipts, Automated Teller Machine (ATM) receipts, business expense receipts and sales receipts and automatically generates reports such as credit card statements, bank statements, tax reports for tax return preparation, market analyses, and the like.

It is a further object of the DataTreasury™ System to retrieve both paper and electronic transactions at remote locations.

It is a further object of the DataTreasury™ System to employ a scanner and a data entry terminal at a customer site to retrieve data from paper transactions and to enable additions or modifications to the scanned information respectively.

It is a further object of the DataTreasury™ System to provide an input device for retrieving transaction data from the memory of smart cards for independent verification of the records maintained by consumers, merchants and bankers to prevent the loss of data from the loss, theft, damage or deliberate alteration of the smart card.

It is a further object of the DataTreasury™ System to retrieve and process transaction data from DataTreasury™ System anonymous smart cards which are identified by an account number and password. Since DataTreasury™ System anonymous smart card transactions can be identified without the customer's name, a customer can add money to the DataTreasury™ System anonymous smart card and make expenditures with the card with the same degree of privacy as cash acquisitions and expenditures.

It is a further object of the DataTreasury™ System to retrieve customer billing data from employee time documents and to generate customer billing statements from the billing data.

It is a further object of the DataTreasury™ System to initiate electronic transactions including transactions on the internet and to provide identification verification by capturing and comparing signature and biometric data.

It is a further object of the DataTreasury™ System of the invention to process electronic and paper transactions with a tiered architecture comprised of DataTreasury™ System Access Terminals (DATs), DataTreasury™ System Access Collectors (DACS) and DataTreasury™ System Processing Concentrators (DPCs).

BRIEF DESCRIPTION OF THE DRAWINGS

These and other objects and features of the invention will be more clearly understood from the following detailed description along with the accompanying drawing figures, wherein.

DETAILED DESCRIPTION OF THE PREFERRED EMBODIMENT

Figure 1:
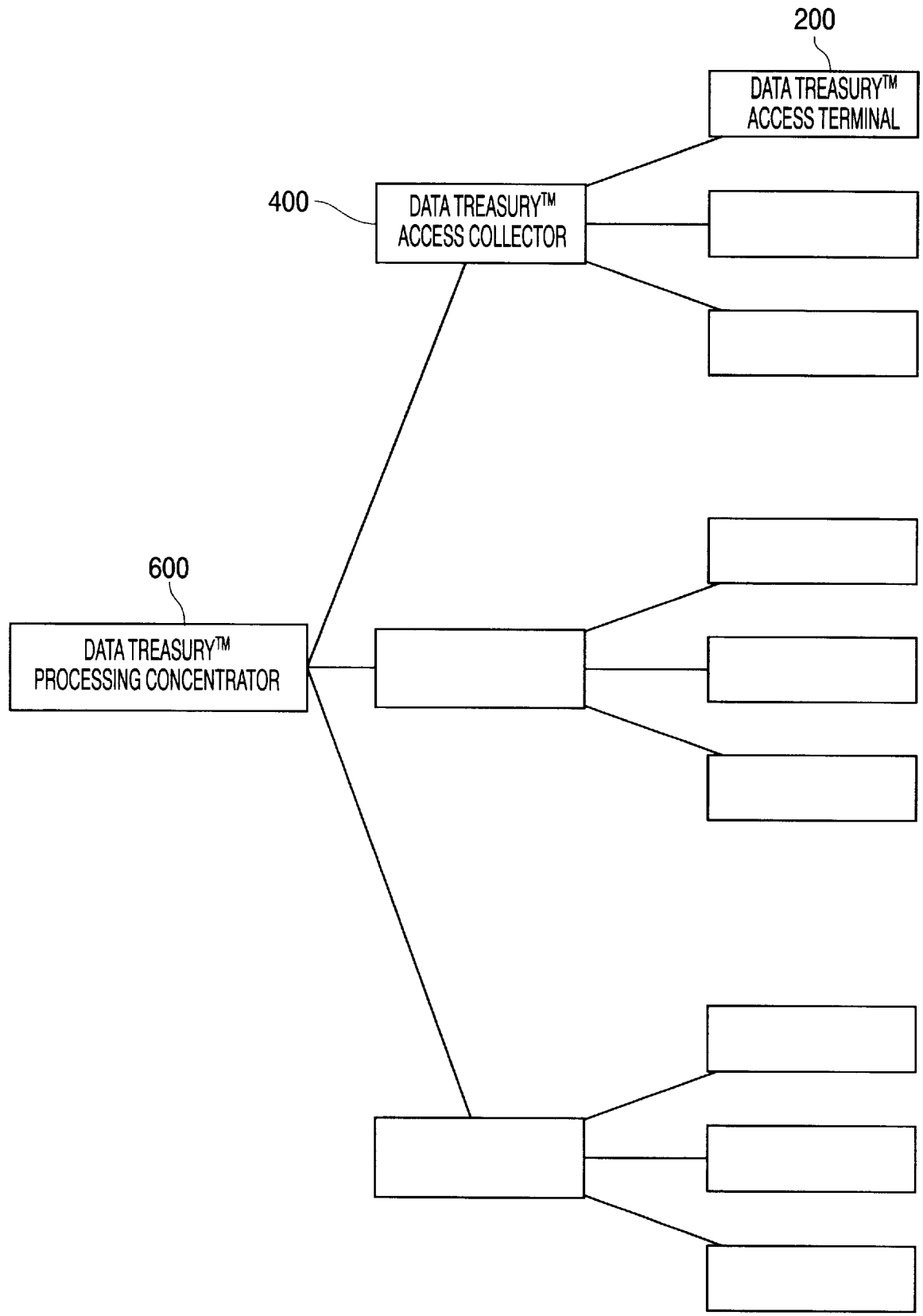
FIG. 1 is a block diagram showing the three major operational elements of the invention: the DataTreasury™ System Access Terminal (DAT), the DataTreasury™ System Access Collector (DAC) and the DataTreasury™ System Processing Concentrator (DPC)

FIG. 1 shows the architecture of the DataTreasury™ System 100. The DataTreasury™ System 100 has three operational elements: the DataTreasury™ System Access Terminal (DAT) 200 (the remote data access subsystem), the DataTreasury™ System Access Collector (DAC) 400 (the intermediate data collecting subsystem), and the DataTreasury™ System Processing Concentrator (DPC) 600 (the central data processing subsystem).

The DataTreasury™ System 100 architecture consists of three tiers. At the bottom tier, the DATs 200 retrieve data from the customer sites. At the next tier, the DACs 400 poll the DATs 200 to receive data which accumulates in the DATs 200. At the top tier, the DPCs 600 poll the DACs 400 to receive data which accumulates in the DACs 400. The DPCs 600 store the customer's data in a central location, generate informative reports from the data and transmit the informative reports to the customers at remote locations.

In the preferred embodiment, the DataTreasury™ System 100 complies with the Price Waterhouse SAS70 industry standard. Specifically, the DataTreasury™ System 100 meets the software development standard, the system deployment standard and the reliability standard specified by Price Waterhouse SAS70. By adhering to the Price Waterhouse SAS70 standard, the DataTreasury™ System 100 provides the security, availability and reliability required by mission critical financial applications of banks and stock brokerage companies.

As is known to persons of ordinary skill in the art, the DataTreasury™ System 100 could also use other software development standard, other system deployment standards and other reliability standards as long as adherence to these alternative standards provides the security, availability and reliability required by mission critical financial applications.

Figure 2:
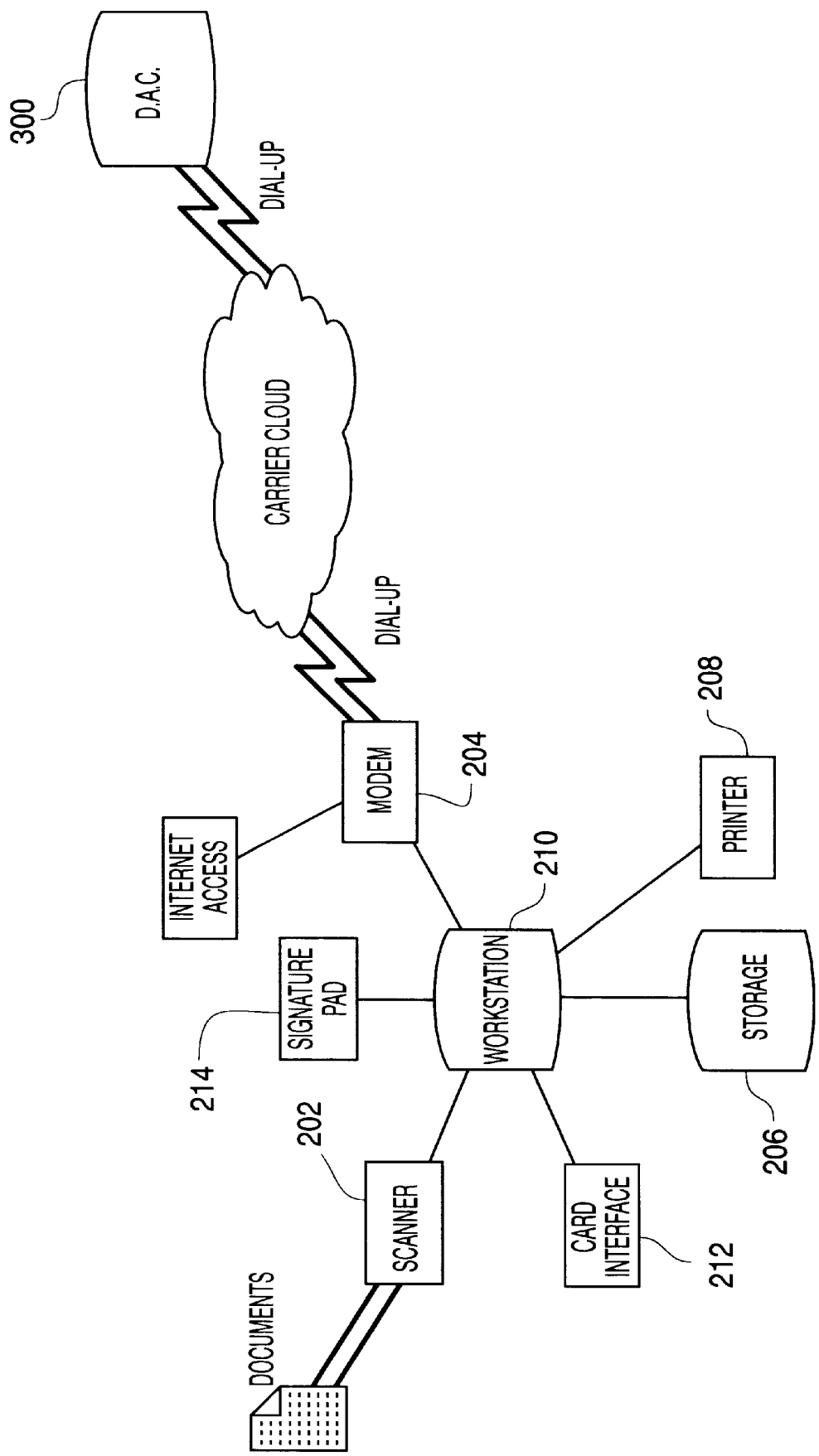
FIG. 2 is a block diagram of the DAT architecture.

FIG. 2 shows a block diagram of the DAT 200 architecture. DATs 200 are located at customer sites. The DataTreasury™ System 100 customers include merchants, consumers and bankers. The DATs 200 act as the customer contact point to the suite of services provided by the DataTreasury™ System 100. In the preferred embodiment, the DAT 200 is custom designed around a general purpose thin client Network Computer (NC) which runs SUN Microsystem's JAVA/OS operating system. The custom designed DAT 200 comprises a DAT scanner 202, a DAT modem 204, DAT digital storage 206, a DAT controller 210 (workstation), a DAT card interface 212, an optional DAT printer 208 and a signature pad 214.

As is known to persons of ordinary skill in the art, the DAT 200 could also be custom designed around a general purpose network computer running other operating systems as long as the chosen operating system provides support for multiprocessing, memory management and dynamic linking required by the DataTreasury™ System 100.

The DAT scanner 202 scans a paper receipt and generates a digital bitmap image representation called a Bitmap Image (BI) of the receipt. In the preferred embodiment, the DAT scanner 202 has the ability to support a full range of image resolution values which are commonly measured in Dots Per Inch (DPI). Next, the DAT scanner 202 has the ability to perform full duplex imaging. With full duplex imaging, a scanner simultaneous captures both the front and back of a paper document. The DAT scanner 202 can also support gray scale and full color imaging at any bit per pixel depth value. The DAT scanner 202 also supports the capture of handwritten signatures for identity verification.

In addition to scanning images and text, the DAT scanner 202 also scans DataGlyph™ elements, available from Xerox Corporation. As is known to persons of ordinary skill in the art, the Xerox DataGlyph™ Technology represents digital information with machine readable data which is encoded into many, tiny, individual glyph elements. Each glyph element consists of a 45 degree diagonal line which could be as short as $\frac{1}{100}$th of an inch depending on the resolution of the scanning and printing devices. Each glyph element represents a binary 0 or 1 depending on whether it slopes downward to the left or the right respectively. Accordingly, DataGlyph™ elements can represent character strings as ASCII or EBCDIC binary representations. Further, encryption methods, as known to persons of ordinary skill in the art encrypt the data represented by the DataGlyph™ Technology.

The use of glyph technology in the DataTreasury™ System 100 improves the accuracy, cost and performance of the system. Xerox DataGlyph™ Technology includes error correction codes which can be referenced to correct scanning errors or to correct damage to the document caused by ink spills or ordinary wear. DataGlyph™ Technology also leads to decreased system cost since the system will require less manual intervention for data entry and correction because of the improved accuracy associated with DataGlyph™ elements. Since DataGlyph™ elements represent a large amount of information in a small amount of space, the DAT scanner 100 will require a small amount of time to input a large amount of information.

The DAT card interface 212 and the DAT signature pad 214 along with the internet and telephone access through the DAT modem 204 enable the DataTreasury™ System 100 customer to initiate secure sale and banking transactions via the internet or telephone with the DAT 200 using a variety of cards including debit cards, smart cards and credit cards. After selecting a purchase or a banking transaction through a standard internet interface, the DataTreasury™ System 100 customer inserts or swipes the debit card, smart card or credit card into the DAT card interface 212.

The DAT card interface 212 retrieves the identification information from the card for subsequent transmission to the destination of the internet transaction. Further, the DAT scanner 202 could capture a hand written signature from a document or the DAT signature pad 214 could capture an electronic signature written on it with a special pen. Similarly, these security featurs allow a credit card recipient to activate the card with a DAT 200 located at a merchant site. The security features would detect unauthorized use of debit cards, credit cards and smart cards resulting from their unlawful interception. Accordingly, the DataTreasury™ System's 100 security features offer a more secure alternative for internet and telephone transactions than the typical methods which only require transmission of a card account number and expiration date.

As is known to persons of ordinary skill in the art, the DATs 200 could also include additional devices for capturing other biometric data for additional security. These devices include facial scans, fingerprints, voice prints, iris scans, retina scans and hand geometry.

In addition to initiating sale and banking transactions, the DAT card interface 212 also reads sale and banking transactions initiated elsewhere from the memory of smart cards to enable subsequent storage and processing by the DataTreasury™ System. If a smart card is lost, stolen, damaged or deliberately altered by an unscrupulous holder after the DAT card interface 212 reads its transaction data, the DataTreasury™ System 100 can reproduce the transaction data for the customer. Accordingly, the DAT card interface 212 provides support for independent verification of the records maintained by consumers, merchants and bankers to prevent the loss of data from the loss, theft, damage or deliberate alteration of the smart card.

The DAT card interface 212 also supports the initiation and retrieval of sale and banking transactions with the DataTreasury™ System anonymous smart cards. In contrast to standard debit cards and credit cards, the DataTreasury™

System anonymous smart card does not identify the card's holder by name. Instead, the DataTreasury™ System anonymous smart card requires only an account number and a password. Since DataTreasury™ system anonymous smart card transactions can be identified without the customer's name, a DataTreasury™ System 100 customer can purchase a DataTreasury™ System anonymous smart card, add money to the card, make expenditures with the card and monitor the card's account with the same degree of privacy as cash acquisition, expenditure and management.

The DAT scanner 202, the internet access, the signature pad 214 and other biometric data capture devices also support the remote capture of survey information and purchase orders. For example, the DAT scanner 202 captures surveys appearing on the back of checks at restaurants and bars. Similarly, the DAT scanner 202 could capture purchase orders from residences, enabling customers to make immediate purchases from their home of goods promoted through the mail. Accordingly, home marketing merchant could transmit sales in a more cost efficient and reliable manner by using the DAT scanner 202 instead of providing envelopes with prepaid postage to residences.

The DAT scanner 202 also captures receipts which are subsequently needed for tax return preparation or tax audits. Similarly, the DAT scanner 202 captures sales receipts from merchants, providing an off-site secure, reliable repository to guard against loss resulting from flooding, fire or other circumstances. This feature could also allow a merchant to automatically perform inventory in a reliable and cost-effective manner.

The DAT controller 210 performs processing tasks and Input/Output (I/O) tasks which are typically performed by a processor. The DAT controller 210 compresses, encrypts and tags the BI to form a Tagged Encrypted Compressed Bitmap Image (TECBI). The DAT controller 210 also manages the Input/Output (I/O). Specifically, the DAT controller 210 manages devices like the DAT scanner 202, the DAT digital storage 206, the optional DAT printer 208 and the DAT modem 204.

The DAT digital storage 208 holds data such as the TECBI. The DAT modem 204 transmits data from the DAT 200 to the appropriate DAC 400 as instructed by the DAT controller 210. Specifically, the DAT modem 204 transmits the TECBIs from the DAT digital storage 208 to the appropriate DAC 400. In the preferred embodiment, the DAT modem 204 is a high speed modem with dial-up connectivity. The DAT digital storage 208 is sufficiently large to store the input data before transmission to a DAC 400. The DAT digital storage 208 can be Random Access Memory (RAM) or a hard drive.

Figure 3A:
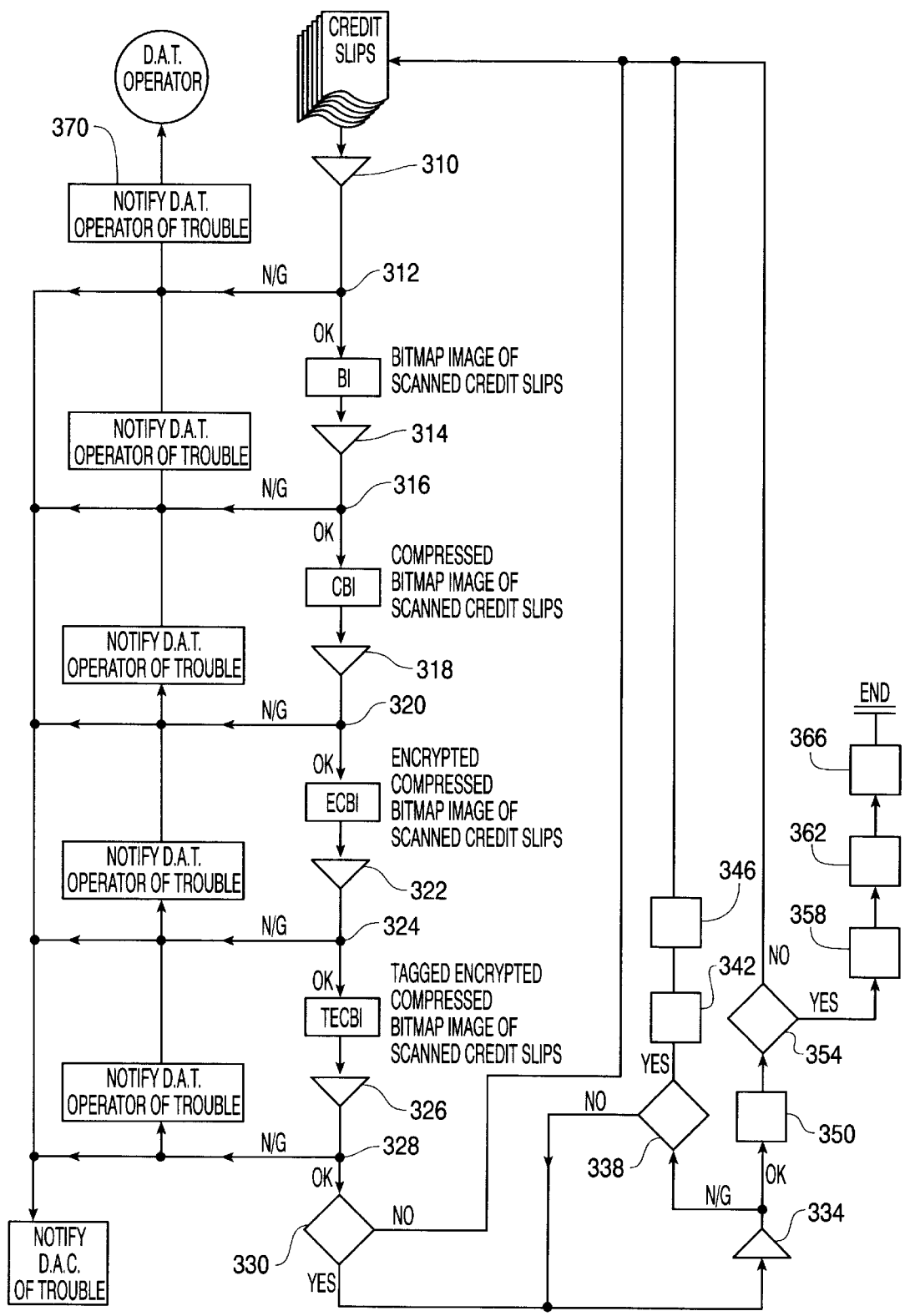
FIG. 3a is a flow chart describing image capture by a DAT.

FIG. 3a is a flow chart 300 describing the operation of the DAT in detail. In step 310, the DAT scanner 202 scans paper receipts into the DAT 200 provided by an operator. In step 312, the DAT controller 210 determines whether the operation executed successfully. If the scanning is successful, the DAT scanner 202 produces a Bitmap Image (BI). If the scanning is unsuccessful, the DAT controller 210 notifies the operator of the trouble and prompts the operator for repair in step 370.

If a BI is created, the DAT controller 210 executes a conventional image compression algorithm like the Tagged Image File Format (TIFF) program to compress the BI in step 314. In step 316, the DAT controller 210 determines whether the compression executed successfully. If the compression is successful, it produces a Compressed Bitmap Image (CBI). If the compression is unsuccessful, the DAT controller 210 notifies the operator of the trouble and prompts the operator for repair in step 370.

If a CBI is created, the DAT controller 210 executes an encryption algorithm which is well known to an artisan of ordinary skill in the field to encrypt the CBI in step 318. Encryption protects against unauthorized access during the subsequent transmission of the data which will be discussed below. In step 320, the DAT controller 210 determines whether the encryption operation executed successfully. If the encryption is successful, it produces an Encrypted Compressed Bitmap Image (ECBI). If the encryption is unsuccessful, the DAT controller 210 notifies the operator of the trouble and prompts the operator for repair in step 370.

If an ECBI is created, the DAT controller 210 tags the ECBI with a time stamp which includes the scanning time, an identification number to identify the merchant originating the scan and any additional useful information in step 322. In step 324, the DAT controller 210 determines whether the tagging operation executed successfully. If the tagging is successful, it produces a Tagged Encrypted Compressed Bitmap Image (TECBI). If the tagging is unsuccessful, the DAT controller 210 notifies the operator of the trouble and prompts the operator for repair in step 370.

If a TECBI is created, the DAT controller 210 stores the TECBI in the DAT digital storage 208 in step 326. In step 328, the DAT controller 210 determines whether the storing operation executed successfully. If the storing operation is successful, the DAT digital storage 208 will contain the TECBI. If the storing operation is unsuccessful, the DAT controller 210 notifies the operator of the trouble and prompts the operator for repair in step 370.

If the TECBI is properly stored in the DAT digital storage 208, the DAT controller 210 determines whether all paper receipts have been scanned in step 330. If all paper receipts have not been scanned, control returns to step 310 where the next paper receipt will be processed as discussed above. If all paper receipts have been scanned, the DAT controller 210 asks the operator to verify the number of scanned receipts in step 334. If the number of scanned receipts as determined by the DAT controller 210 does not equal the number of scanned receipts as determined by the operator, the DAT controller 210 asks whether the operator desires to rescan all of the receipts in step 338.

If the operator chooses to rescan all of the receipts in step 338, the DAT controller 210 will delete all of the TECBIs associated with the batch from the DAT digital storage 208 in step 342. After the operator prepares the batch of receipts for rescan in step 346, control returns to step 310 where the first receipt in the batch will be processed as discussed above.

If the operator chooses not to rescan all of the receipts from the batch in step 338, control returns to step 334 where the DAT controller 210 asks the operator to verify the number of scanned receipts as discussed above.

If the number of scanned receipts as determined by the DAT controller 210 equals the number of scanned receipts as determined by the operator, the DAT controller 210 prints a batch ticket on the DAT printer 206 in step 350. The operator will attach this batch ticket to the batch of receipts which have been scanned. This batch ticket shall contain relevant session information such as scan time, number of receipts and an identification number for the data operator. If processing difficulties occur for a batch of receipts after the image capture of flowchart 300, the batch ticket will enable them to be quickly located for rescanning with the DAT 200.

In step 354, the DAT controller 210 determines whether the scan session has completed. If the scan session has not completed, control returns to step 310 where the first receipt in the next batch of the scan session will be processed as discussed above. If the scan session has completed, the DAT controller 210 selectively prints a session report on the DAT printer 206 in step 358. The DAT controller 210 writes statistical information for the session to the DAT digital storage 208 in step 362. In step 366, the DAT controller 210 terminates the session.

Figure 3B:
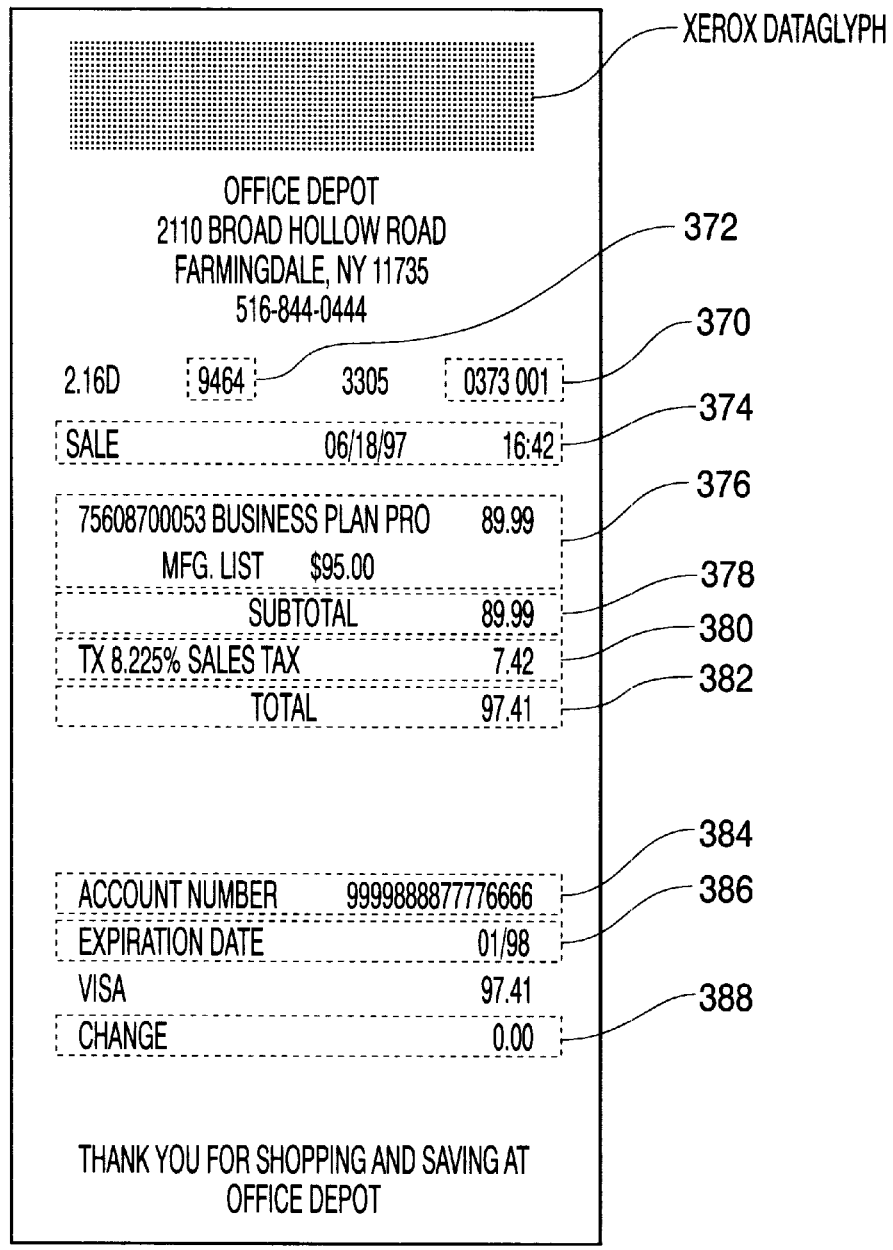
FIG. 3b displays a sample paper receipt which is processed by the DAT.

FIG. 3b displays a sample paper receipt which is processed by the DAT 200 as described by the flowchart in FIG. 3a. The sample paper receipt involves a credit card transaction which has four participants:

A. The ISSUER: is an entity such as a bank or corporate financial institution such as GE Capital, GM or AT&T which provides the credit behind the credit card and issues the card to the consumer.

B. The PROCESSOR: executes the processing of an inbound credit card transaction by performing basic transaction validation that includes checking with the ISSUER database to ensure that the credit card has sufficient credit to allow approval of the transaction.

C. The ACQUIRER: specializes in the marketing, installation and support of Point Of Sale (POS) credit card terminals. The acquirer, like the DAC 400 in the DataTreasury™ System 100 acts as an electronic collection point for the initial credit card transaction as the card is inserted into the POS terminal. After acquisition, the acquirer passes the transaction to the PROCESSOR.

D. The MERCHANT: inserts a credit card into a POS terminal and enters the amount of the transaction to initiate the credit card transaction.

In the preferred embodiment, the DAT 200 reads the following information from the sample paper receipt shown in FIG. 3i band stores the information in the format described below.

CUSTOMER_ID 370: This field is a 7 position HEX numeric value. This field uniquely identifies the customer using the terminal. In this sample, this field would identify the credit card merchant.

TERMINAL_ID 372: This field is a 6 position decimal numeric value. This field uniquely identifies the credit card terminal which is used to print the credit card receipt.

TRANSACTION_DATE 374: This field contains the date and time of the credit card transaction.

TRANSACTION_LINE_ITEM 376: This field is a variable length character string. The first three positions represent a right justified numeric field with leading zeros indicating the full length of this field. This field contains all data pertaining to the purchased item including the item's price. The DAT 200 will store a TRANSACTION_LINE_ITEM field for each transaction line item on the receipt. This field is optional since not all credit card transactions will have line items.

TRANSACTION_SUBTOTAL 378: This field is a double precision floating point number. This field indicates the subtotal of the TRANSACTION_LINE_ITEMs.

TRANSACTION_SALES_TAX 380: This field is a double precision floating point number. This field contains the sales tax of the TRANSACTION_SUBTOTAL.

TRANSACTION_AMOUNT 382: This field is a double precision floating point number. This field is the sum of the TRANSACTION_SUBTOTAL and TRANSACTION_SALES_TAX.

CREDIT_CARD_ACCT_NUM 384: This field is a 12 position decimal value. This field identifies the credit card which was used to execute this transaction.

CREDIT_CARD_EXP_DATE 386: This field identifies the expiration date of the credit card.

TRANSACTION_APPROVAL_CODE 388: This field is a 6 position numeric value. This field indicates the approval code that was given for the particular transaction.

The DAT 200 also stores additional items which are not pictured in FIG. 3b as described below:

ISSUER_ID: This field is a 7 position decimal numeric value. This field identifies the credit card issuer.

ACQUIRER_ID: This field is a 7 position decimal numeric value. This field identifies the acquirer.

PROCESSOR_ID: This field is a 7 position decimal numeric value. This field identifies the processor.

TRANSACTION_LINE_ITEM_CNT: This field is a 3 position decimal numeric value. This field identifies the number of transaction line items on the receipt. A value of ZERO indicates the absence of any transaction line items on the receipt.

TRANSACTION_GRATUITY: This field is a double precision floating number. This field is optional because it will only appear on restaurant or bar receipts.

FINAL_TRANSACTION_AMOUNT: This field is a double precision floating number. This field is optional because it will only appear on restaurant and bar receipts. The field is the sum of the TRANSACTION_AMOUNT and TRANSACTION_GRATUITY.

The tag prepended to the ECBI in step 322 of the flowchart of FIG. 3a identifies the time and place of the document's origination. Specifically, the tag consists of the following fields:

DAT_TERMINAL_ID: This field is a 7 position hexadecimal numeric value. This field uniquely identifies the DAT 200 which is used by the customer.

DAT_SESSION_DATE: This field identifies the date and time of the DAT 200 session which generated the image of the document.

DAT_USER_ID: This field is a 4 position decimal numeric value. This field identifies the individual within the CUSTOMER's organization who initiated the DAT 200 session.

DATA_GLYPH_RESULT: This field is a variable length character string. The first four positions hold a right justified numeric position with leading zero which indicate the length of the field. The fifth position indicates the DataGlyph™ element status. A value of 0 indicates that the data glyph was NOT PRESENT on the receipt. A value of 1 indicates that the data glyph WAS PRESENT and contained no errors. A value of 2 indicates that the data glyph WAS PRESENT and had nominal errors. If the fifth position of this field has a value of 2, the remaining portion of the string identifies the erroneous field numbers. As subsequently described, the DPC 600 will reference this portion of the field to capture the erroneous data from the receipt with alternate methods. A value of 3 indicates that the data glyph WAS PRESENT WITH SEVERE ERRORS. In other words, a value of 3 indicates the DataGlyph™ element was badly damaged and unreadable.

The receipt shown in FIG. 3b can also contain a signature which can be captured by the DAT scanner 202. A data glyph could identify the location of the signature on the receipt.

As is known to persons of ordinary skill in the art, the DataTreasury™ System 100 can also process receipts with alternate formats as long as the receipt contains the appropriate identification information such as the transaction amount, the customer, the DAT 200, the transaction date, the transaction tax, the credit card number, the credit card expiration date, etc.

The DataTreasury™ System 100 partitions the paper receipt into image snippets as illustrated by the sample on FIG. 3b. Partitioning facilitates an improvement in the process to correct errors from the scanning operation. If an error occurred during scanning, the DataTreasury™ System 100 corrects the error using manual entry. With partitioning, the DataTreasury™ System 100 focuses the correction effort on only the image snippet having the error instead of correcting the entire document. The subsequently discussed schema of the DataTreasury™ System 100 database describes the implementation of the partitioning concept in detail.

Figure 4:
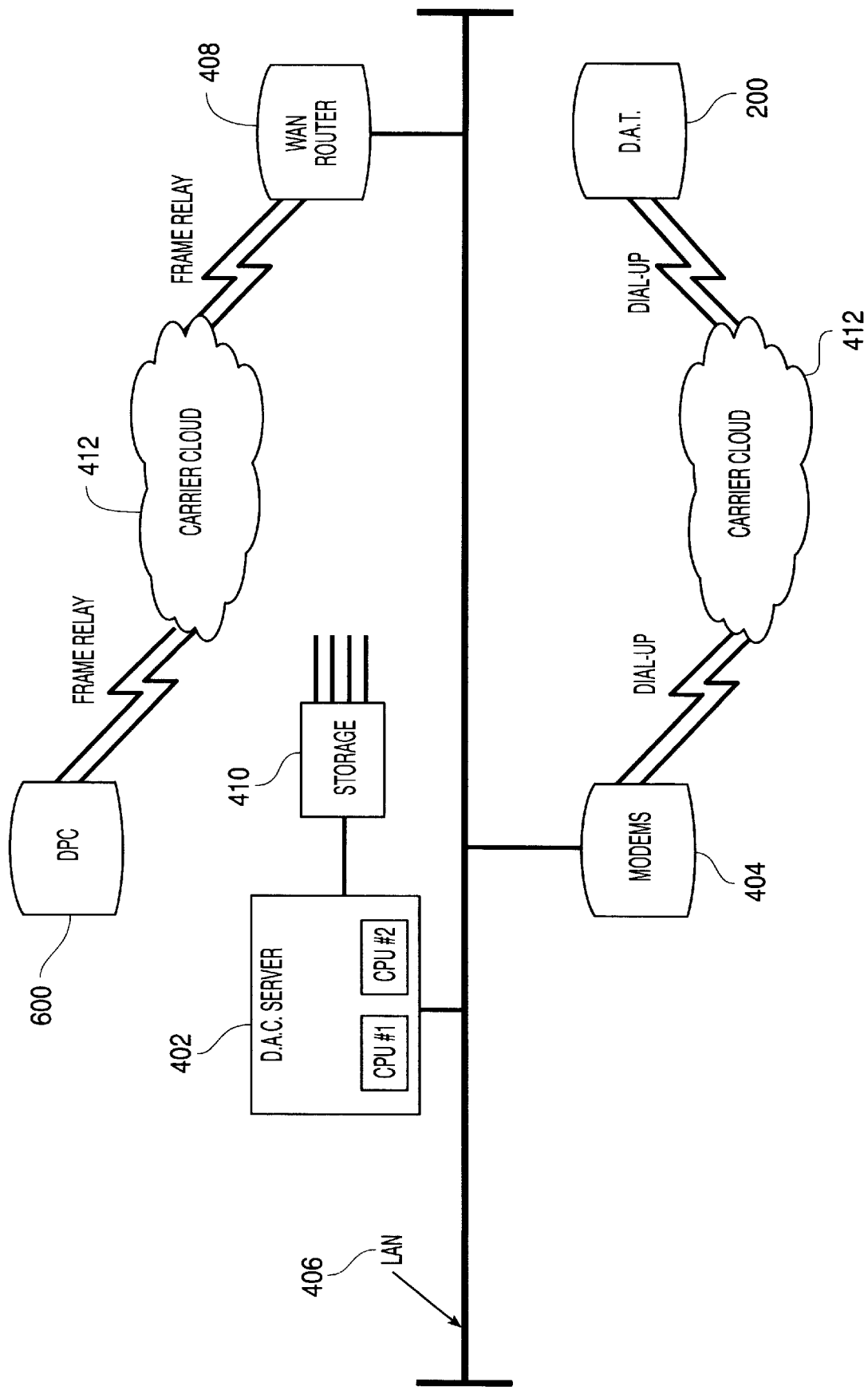
FIG. 4 is a block diagram of the DAC architecture.

The DACs 400 form the backbone of the tiered architecture shown in FIG. 1 and FIG. 4. As shown in FIG. 1, each DAC 400 supports a region containing a group of DATs 200. Each DAC 400 polls the DATs 200 in its region and receives TECBIs which have accumulated in the DATs 200. The DACs 400 are located at key central sites of maximum merchant density.

In the preferred embodiment, the DAC server 402 comprises stand-alone Digital Equipment Corporation (DEC) SMP Alpha 4100 2/566 servers which are connected on a common network running Windows NT. The DEC Alpha servers manage the collection and intermediate storage of images and data which are received from the DATs 200.

As is known to persons of ordinary skill in the art, the DataTreasury™ System 100 could use any one of a number of different servers that are available from other computer vendors as long as the server meets the capacity, performance and reliability requirements of the system.

In the preferred embodiment, the DAC server 402 also comprises EMC 3300 SYMMETRIX CUBE Disk Storage Systems, which store the images and data collected and managed by the DEC Alpha servers. The DAC 400 architecture also uses a SYMMETRIX Remote Data Facility (SRDF), available from EMC, to enable multiple, physically separate data centers housing EMC Storage Systems to maintain redundant backups of each other across a Wide Area Network (WAN). Since SRDF performs the backup operations in the background, it does not affect the operational performance of the DataTreasury™ System 100. The DAC server 402 also has secondary memory 410. In the preferred embodiment, the secondary memory 410 is a small scale DLT jukebox.

The DAC Alpha servers of the DAC server 402 insert images and data received from the DATS 200 into a database which is stored on the disk storage systems using a data manipulation language as is well known to persons of ordinary skill in the art. In the preferred embodiment, the database is a relational database available from Oracle.

As is well known to persons of ordinary skill in the art, the DataTreasury™ System 100 could use any one of a number of different database models which are available from other vendors including the entity relationship model as long as the selected database meets the storage and access efficiency requirements of the system. See, e.g., Chapter 2 of Database System Concepts by Korth and Silberschatz.

The DAC 400 architecture uses a WEB based paradigm using an enhanced Domain Name Services (DNS), the Microsoft Component Object Model (DCOM), and Windows NT Application Program Interfaces (APIs) to facilitate communication and load balancing among the servers comprising the DAC server 402. As is known to persons of ordinary skill in the art, DNS, which is also known as Bind, statically translates name requests to Internet Protocol 4 (IP4) addresses. In the DAC 400 architecture, an enhanced DNS dynamically assigns IP4 addresses to balance the load among the servers comprising the DAC server 402.

In the preferred embodiment, the enhanced DNS is designed and implemented using objects from Microsoft DCOM. Using the DCOM objects, the enhanced DNS acquires real-time server load performance statistics on each server comprising the DAC server 402 from the Windows NT API at set intervals. Based on these load performance statistics, the enhanced DNS adjusts the mapping of name requests to IP4 addresses to direct data toward the servers which are more lightly loaded.

A large bank of modems 404 polls the DATs 200 at the customer sites within the DAC's 400 region. In the preferred embodiment, the bank of modems 404, available as CISCO AS5200, is an aggregate 48 modem device with Local Area Network (LAN) 406 connectivity which permits the DAC servers 402 to dial the DATs 200 without requiring 48 separate modems and serial connections.

The DAC servers 402 and the bank of modems 404 are connected on a LAN 406. In the preferred embodiment, the LAN uses a switched 100BaseT/10BaseT communication hardware layer protocol. As is known to persons of ordinary skill in the art, the 100BaseT/10BaseT protocol is based on the Ethernet model. Further, the numbers 100 and 10 refer to the communication link speed in megabits per second. In the preferred embodiment, the CISCO Catalyst 2900 Network Switch supports the LAN 406 connectivity between the devices connected to the LAN 406 including the DAC servers 402 and the bank of modems 404.

As is known to persons of ordinary skill in the art, alternate LAN architectures could be used to facilitate communication among the devices of the LAN 406. For example, the LAN 406 could use a hub architecture with a round robin allocation algorithm, a time division multiplexing algorithm or a statistical multiplexing algorithm.

A Wide Area Network (WAN) router 408 connects the LAN 406 to the WAN to facilitate communication between the DACs 400 and the DPCs 600. In the preferred embodiment, the WAN router 408 is a CISCO 4700 WAN Router. The WAN router 408 uses frame relay connectivity to connect the DAC LAN 406 to the WAN. As is known to persons of ordinary skill in the art, alternate devices, such as the NORTEL Magellen Passport "50" Telecommunication Switch, could be used to facilitate communication between the DACs 400 and the DPCs 600 as long as the selected router meets the performance and quality communication requirements of the system.

As is known to persons of ordinary skill in the art, frame relay is an interface protocol for statistically multiplexed packet-switched data communications in which variable-sized packets (frames) are used that completely enclose the user packets which they transport. In contrast to dedicated point to point links that guarantee a specific data rate, frame relay communication provides bandwidth on-demand with a guaranteed minimum data rate. Frame relay communication also allows occasional short high data rate bursts according to network availability.

Each frame encloses one user packet and adds addressing and verification information. Frame relay data communication typically has transmission rates between 56 kilobytes per second (kb/s) and 1.544 megabytes per second (Mb/s). Frames may vary in length up to a design limit of approximately 1 kilobyte.

The Telco Carrier Cloud 412 is a communication network which receives the frames destined for the DPC 600 sent by the WAN router 408 from the DACs 400. As is known to persons of ordinary skill in the art, carriers provide communication services at local central offices. These central offices contain networking facilities and equipment to interconnect telephone and data communications to other central offices within its own network and within networks of other carriers.

Since carriers share the component links of the interconnection network, data communication must be dynamically assigned to links in the network according to availability. Because of the dynamic nature of the data routing, the interconnection network is referred to as a carrier cloud of communication bandwidth.

All the DAC 400 equipment is on fully redundant on-line UPS power supplies to insure maximum power availability. Further, to minimize the time for trouble detection, trouble analysis and repair, all the DAC 400 equipment incorporates trouble detection and remote reporting/diagnostics as is known to an artisan of ordinary skill in the art.

Figure 5:
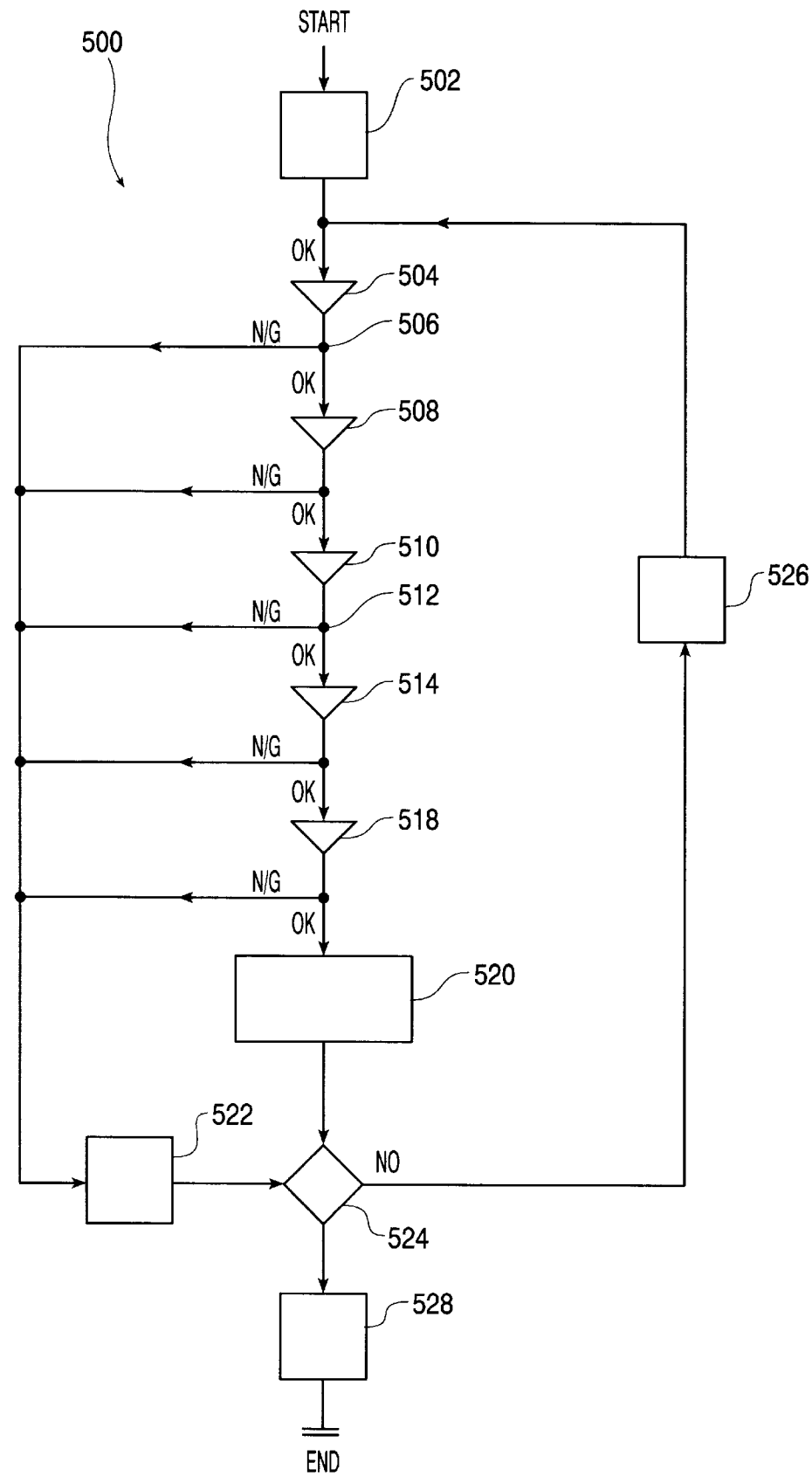
FIG. 5 is a flow chart describing the polling of the DATs by a DAC.

FIG. 5 is a flow chart 500 describing the polling of the DATs 200 by a DAC 400 and the transmission of the TECBIs from the DATs 200 to the DAC 400. In step 502, the DAC server 402 reads the address of the first DAT 200 in its region for polling. In step 504, a modem in the modem bank 404 dials the first DAT 200. The DAC 400 determines whether the call to the DAT 200 was successful in step 506. If the call to the first DAT 200 was unsuccessful, the DAC 400 will record the error condition in the session summary report and will report the error to the DPC 600 in step 522.

If the call to the first DAT 200 was successful, the DAC 400 will verify that the DAT 200 is ready to transmit in step 508. If the DAT 200 is not ready to transmit, the DAC 400 will record the error condition in the session summary report and will report the error to the DPC 600 in step 522.

If the DAT 200 is ready to transmit in step 508, the DAT 200 will transmit a TECBI packet header to the DAC 400 in step 510. The DAC 400 will determine whether the transmission of the TECBI packet header was successful in step 512. If the transmission of the TECBI packet header was unsuccessful, the DAC 400 will record the error condition in the session summary report and will report the error to the DPC 600 in step 522.

If the transmission of the TECBI packet header was successful in step 512, the DAT 200 will transmit a TECBI packet to the DAC 400 in step 514. The DAC 400 will determine whether the transmission of the TECBI packet was successful in step 516. If the transmission of the TECBI packet header was unsuccessful, the DAC 400 will record the error condition in the session summary report and will report the error to the DPC 600 in step 522.

If the transmission of the TECBI packet was successful in step 516, the DAC 400, in step 518, will compare the TECBI packet header transmitted in step 510 to the TECBI packet transmitted in step 514. If the TECBI packet header does not match the TECBI packet, the DAC 400 will record the error condition in the session summary report and will report the error to the DPC 600 in step 522.

If the TECBI packet header matched the TECBI packet in step 518, the DAC 400 will set the status of the TECBI packet to indicate that it is ready for transmission to the DPC 600 in step 520. The DAC 400 will also transmit the status to the DAT 200 to indicate successful completion of the polling and transmission session in step 520. Next, the DAC 400 will determine whether TECBIs have been transmitted from all of the DATs 200 in its region in step 524. If all DATs 200 in the DAC's 400 region have transmitted TECBIs to the DAC 400, the DAC 400 will compile a DAT 200 status report in step 528 before terminating the session.

If one or more DATs 200 in the DAC's 400 region have not transmitted TECBIs to the DAC 400, the DAC 400 will get the address of the next DAT 200 in the region in step 526.

Next, control returns to step 504 where the next DAT 200 in the DAC's 400 region will be polled as previously discussed.

In the preferred embodiment, the DAC server 402 initiates the polling and data transmission at optimum toll rate times to decrease the cost of data transmission. In addition to the raid drives and redundant servers, the DAC 400 will also have dual tape backup units which will periodically backup the entire data set. If there is a catastrophic failure of the DAC 400, the tapes can be retrieved and sent directly to the DPC 600 for processing. As the DAT 200 polling and data transmission progresses, the DAC 400 will periodically update the DPC 600 with its status. If there is a catastrophic failure with the DAC 400, the DPC 600 would know how much polling and backup has been done by the failing DAC 400. Accordingly, the DPC 600 can easily assign another DAC 400 to complete the polling and data transmission for the DATs 200 in the failed DAC's 400 region.

Figure 6:
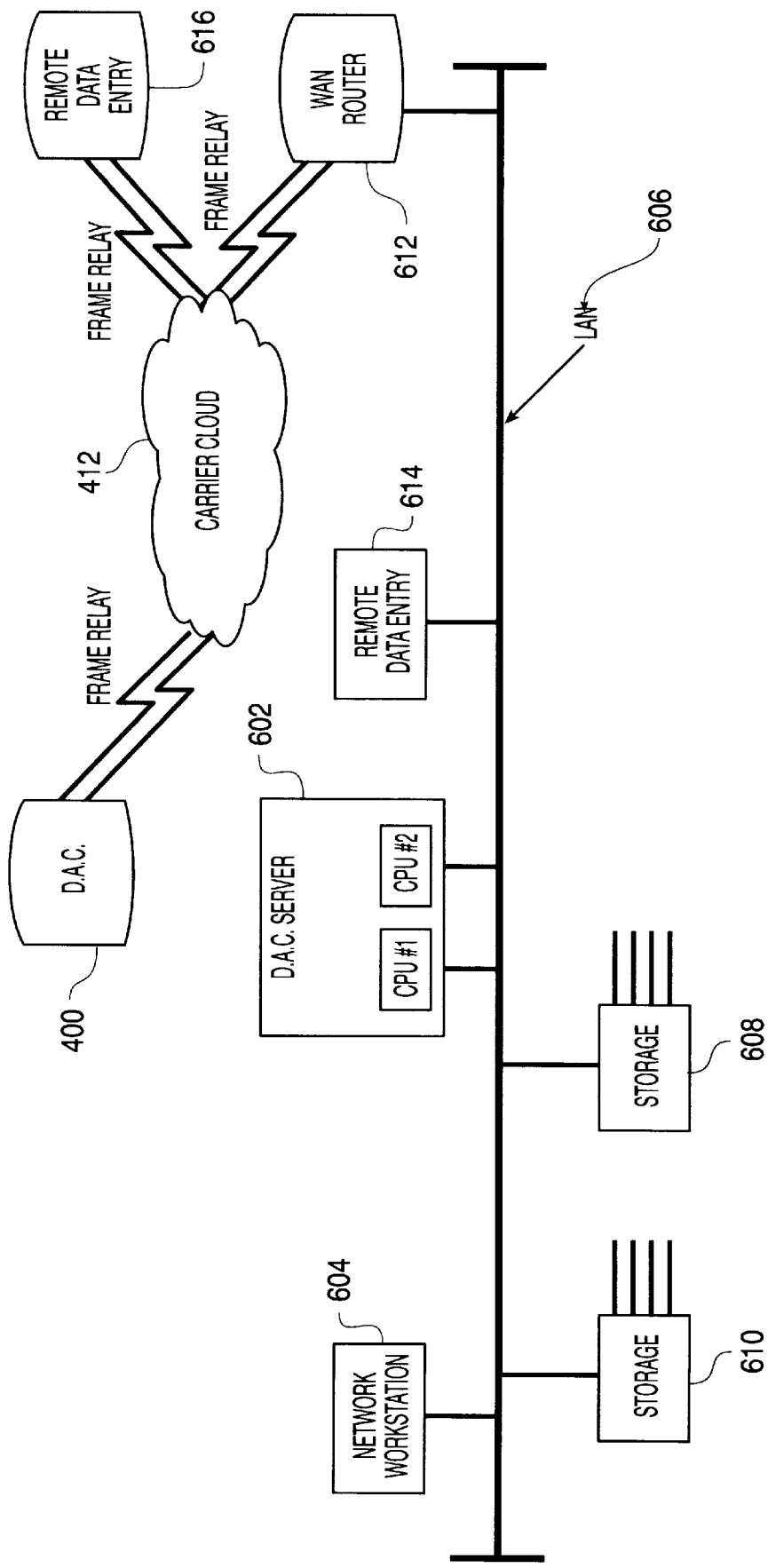
FIG. 6 is a block diagram of the DPC architecture.

FIG. 6 is a block diagram of the DPC 600 architecture. The DPC 600 accumulates, processes and stores images for later retrieval by DataTreasury™ System retrieval customers who have authorization to access relevant information. DataTreasury™ System retrieval customers include credit card merchants, credit card companies, credit information companies and consumers. As shown in FIG. 6 and FIG. 1, the DPC 600 polls the DACs 400 and receives TECBIs which have accumulated in the DACs 400.

In the preferred embodiment, the DPC server 602 comprises stand-alone Digital Equipment Corporation (DEC) SMP Alpha 4100 4/566 servers which are connected on a common network running Windows NT. The DEC Alpha servers manage the collection and intermediate storage of images and data which are received from the DACs 400.

In the preferred embodiment, the DPC server 602 also comprises EMC 3700 SYMMETRIX CUBE Disk Storage Systems, which store the images and data collected and managed by the DEC Alpha servers. Like the DAC 400 architecture, the DPC 600 architecture uses a SYMMETRIX Remote Data Facility (SRDF), available from EMC, to enable multiple, physically separate data centers housing EMC Storage Systems to maintain redundant backups of each other across a Wide Area Network (WAN).

Like the DAC 400 architecture, the DPC 600 architecture uses a WEB based paradigm using an enhanced Domain Name Services (DNS), the Microsoft Component Object Model (DCOM), and Windows NT Application Program Interfaces (APIs) to facilitate communication and load balancing among the servers comprising the DPC server 602 as described above in the discussion of the DAC 400 architecture.

The workstation 604 performs operation control and system monitoring and management of the DPC 600 network. In the preferred embodiment, the workstation 604, available from Compaq, is an Intel platform workstation running Microsoft Windows NT 4.x. The workstation 604 should be able to run Microsoft Windows NT 5.x when it becomes available. The workstation 604 executes CA Unicenter TNG software to perform network system monitoring and management. The workstation 604 executes SnoBound Imaging software to display and process TECBIs.

The workstation 604 also performs identification verification by comparing signature data retrieved remotely by the DATs 200 with signature data stored at the DPC 600. In the preferred embodiment, signature verification software, available from Communications Intelligence Corporation of Redwood Shores, Calif. executing on the workstation 604 performs the identification verification. As is known to persons of ordinary skill in the art, the workstation 604 could execute other software to perform identification verification by comparing biometric data including facial scans, fingerprints, retina scans, iris scans and hand geometry. Thus, the DPC 600 could verify the identity of a person who is making a purchase with a credit card by comparing the biometric data captured remotely with the biometric data stored at the DPC 600.

As is known to persons of ordinary skill in the art, the DataTreasury™ System 100 could use workstations with central processing units from other integrated circuit vendors as long as the chosen workstation has the ability to perform standard operations such as fetching instructions, fetching data, executing the fetched instructions with the fetched data and storing results. Similarly, the DataTreasury™ System 100 could use alternate windows operating systems and network monitoring software as long as the selected software can monitor the status of the workstations and links in the network and display the determined status to the operator.

The Remote Data Entry Gateway 614 and the Remote Offsite Data Entry Facilities 616 correct errors which occurred during data capture by the DAT 200. Since the DataTreasury™ System 100 partitions the document as described in the discussion of the sample receipt of FIG. 3b, the operator at the Remote Data Entry Gateway 614 or the Remote Offsite Date Entry Facilities 616 only needs to correct the portion of the document or image snippet which contained the error.

Partitioning improves system performance, decreases system cost and improves system quality. With partitioning, the DPC Server 602 only sends the portion of the document containing the error to the Remote Data Entry Gateway 614 or the Remote Offsite Data Entry Facilities 616. Since the operator at these data entry locations only sees the portion of the document which contained the error, she can quickly recognize and correct the error. Without partitioning, the operator would have to search for the error in the entire document. With this inefficient process, the operator would need more time and would be more likely to make a mistake by missing the error or making a modification in the wrong location. Accordingly, partitioning improves system performance and quality by increasing the speed and accuracy of the error correction process.

Similarly, partitioning decreases the traffic on the DPC LAN 606 and the Telco Carrier Cloud 412 because the DPC Server 602 only sends the image snippet containing the error to the Remote Offsite Data Entry Facility 616 or the Remote Data Entry Gateway 614. Accordingly, partitioning decreases system cost by reducing the bandwidth requirement on the interconnection networks.

A DPC LAN 606 facilitates communication among the devices which are connected to the LAN 606 including the DPC server 602 and the network workstation 604. In the preferred embodiment, the DPC LAN 606 uses a switched 100BaseT/10BaseT communication hardware layer protocol like the DAC LAN 406 discussed earlier. In the preferred embodiment, the DPC LAN 406 is a high speed OC2 network topology backbone supporting TCP/IP. The CISCO Catalyst 5500 Network Switch supports the DPC LAN 606 connectivity among the devices connected to the LAN 606.

As is known to persons of ordinary skill in the art, alternate LAN architectures could be used to facilitate communication among the devices of the LAN 406. For example, the LAN 406 could use a hub architecture with a round robin allocation algorithm, a time division multiplexing algorithm or a statistical multiplexing algorithm.

A Wide Area Network (WAN) router 612 connects the DPC LAN 606 to the WAN to facilitate communication between the DACs 400 and the DPCs 600. In the preferred embodiment, the WAN router 612 is a CISCO 7507 WAN Router. The WAN router 612 uses frame relay connectivity to connect the DPC LAN 612 to the WAN. As is known to persons of ordinary skill in the art, alternate devices, such as the NORTEL Magellen Passport "50" Telecommunication Switch, could be used to facilitate communication between the DACs 400 and the DPCs 600 as long as the selected router meets the performance and quality communication requirements of the system The DPC 600 has a three tier storage architecture to support the massive storage requirement on the DataTreasury™ System 100. In the preferred embodiment, the storage architecture consists of Fiber Channel RAID technology based EMC Symmetrix Enterprise Storage Systems where individual cabinets support over 1 Terabyte of storage. After TECBI images have been processed and have been on-line for 30 days, they will be moved to DVD based jukebox systems. After the TECBI images have been on-line for 90 days, they will be moved to Write Once Read Many (WORM) based jukebox systems 608 for longer term storage of up to 3 years in accordance with customer requirements.

In an alternate embodiment, the DPC 600 is intended to also configure a High Density Read Only Memory (HD-ROM) when it becomes available from NORSAM Technologies, Los Alamos, N. Mex., into optical storage jukebox systems 610, such as that which is available from Hewlett Packard, to replace the DVD components for increased storage capacity. The HD-ROM conforms to CD-ROM form factor metallic WORM disc. The HD-ROM currently has a very large storage capacity of over 320 giga bytes (320 GB) on a single platter and has an anticipated capacity of several terabytes (TB) on a single platter. The DPC 600 uses IBM and Philips technology to read from the HD-ROM and to write to the HD-ROM.

The DPC Alpha servers of the DPC server 602 insert images and data received from the DACs 400 into a single database which is stored on the Digital Storage Works Systems using a data manipulation language as is well known to persons of ordinary skill in the art. In the preferred embodiment, the database is the V8.0 Oracle relational database which was designed to support both data and image storage within a single repository.

As known to persons of ordinary skill in the art, a relational database consists of a collection of tables which have a unique name. See, e.g., Chapter Three of Database System Concepts by Korth and Silberschatz. A database schema is the logical design of the database. Each table in a relational database has attributes. A row in a table represents a relationship among a set of values for the attributes in the table. Each table has one or more superkeys. A superkey is a set of one or more attributes which uniquely identify a row in the table. A candidate key is a superkey for which no proper subset is also a superkey. A primary key is a candidate key selected by the database designer as the means to identify a row in a table.

As is well known to persons of ordinary skill in the art, the DataTreasury™ System 100 could use other database models available from other vendors including the entity relationship model as long as the selected database meets the storage and access efficiency requirements of the system. See, e.g., Chapter 2 of Database System Concepts by Korth and Silberschatz.

An exemplary DPC 600 basic schema consists of the tables listed below. Since the names of the attributes are descriptive, they adequately define the attributes' contents. The primary keys in each table are identified with two asterisks (**). Numeric attributes which are unique for a particular value of a primary key are denoted with the suffix, "NO". Numeric attributes which are unique within the entire relational database are denoted with the suffix, "NUM".

I. CUSTOMER: This table describes the DataTreasury™ System customer.
  A. **CUSTOMER_ID
  B. COMPANY_NAME
  C. CONTACT
  D. CONTACT_TITLE
  E. ADDR1
  F. ADDR2
  G. CITY
  H. STATE_CODE
  I. ZIP_CODE
  J. COUNTRY_CODE
  K. VOX_PHONE
  L. FAX_PHONE
  M. CREATE_DATE II. CUSTOMER_MAIL_TO: This table describes the mailing address of the DataTreasury™ System customer.
  A. **MAIL_TO_NO
  B. **CUST_ID
  C. CUSTOMER_NAME
  D. CONTACT
  E. CONTACT_TILE
  F. ADDR1
  G. ADDR2
  H. CITY
  I. STATE_CODE
  J. ZIP_CODE
  K. COUNTRY_CODE
  L. VOX_PHONE
  M. FAX_PHONE
  N. CREATE_DATE
  O. COMMENTS III. CUSTOMER_DAT_SITE: This table describes the DAT location of the DataTreasury™ System customer.
  A. **DAT_SITE_NO
  B. **CUST_ID
  C. CUSTOMER_NAME
  D. CONTACT
  E. CONTACT_TILE
  F. ADDR1
  G. ADDR2
  H. CITY
  I. STATE_CODE
  J. ZIP_CODE
  K. COUNTRY_CODE
  L. VOX_PHONE
  M. FAX_PHONE
  N. CREATE_DATE
  O. COMMENTS IV. CUSTOMER_SITE_DAT: This table describes the DAT site(s) of the DataTreasury™ System customer.
  A. **DAT_TERMINAL_ID
  B. **DAT_SITE_NO
  C. **CUST_ID
  D. INSTALL_DATE
  E. LAST_SERVICE_DATE
  F. CREATE_DATE
  G. COMMENTS V. DATA_SPEC: This table provides data specifications for document partitioning and extraction.
  A. **DATA_SPEC_ID
  B. **CUST_ID
  C. DESCR
  D. RECORD_LAYOUT_RULES
  E. CREATE_DATE
  F. COMMENTS VI. DATA_SPEC_FIELD: This table provides field data specifications for document partitioning and extraction.
  A. **DATA_SPEC_NO
  B. **DATA_SPEC_ID
  C. FIELD_NAME
  D. DESCR
  E. DATA_TYPE
  F. VALUE_MAX
  G. VALUE_MIN
  H. START_POS
  I. END_POS
  J. FIELD_LENGTH
  K. RULES
  L. CREATE_DATE
  M. COMMENTS VII. TEMPL_DOC: This table specifies the partitioning of a predefined document.
  A. **TEMPL_DOC_NUM
  B. DATA_SPEC_ID
  C. DESCR
  D. RULES
  E. CREATE_DATE
  F. COMMENTS VIII. TEMPL_FORM: This table defines the location of forms on a predefined document.
  A. **TEMPL_FORM_NO
  B. **TEMPL_DOC_NUM
  C. SIDES_PER_FORM
  D. MASTER_IMAGE_SIDE_A
  E. MASTER_IMAGE_SIDE_B
  F. DISPLAY_ROTATION_A
  G. DISPLAY_ROTATION_B
  H. DESCR
  I. RULES
  J. CREATE_DATE IX. TEMPL_PANEL: This table specifies the location of panels within the forms of a predefined document.
  A. **TEMPL_PANEL_NO
  B. **TEMPL_SIDE_NO
  C. **TEMPL_FORM_NO
  D. **TEMPL_DOC_NUM
  E. DISPLAY_ROTATION
  F. PANEL_UL_X
  G. PANEL_UL_Y
  H. PANEL_LR_X

I. PANEL_LR_Y
J. DESCR
K. RULES
L. CREATE_DATE

X. TEMPL_FIELD: This table defines the location of fields within the panels of a form of a predefined document.
  A. **TEMPL_FIELD_NO
  B. **TEMPL_PANEL_NO
  C. **TEMPL_SIDE_NO
  D. **TEMPL_FORM_NO
  E. **TEMPL_DOC_NUM
  F. DISPLAY_ROTATION
  G. FLD_UL_X
  H. FLD_UL_Y
  I. FLD_LR_X
  J. FLD_LR_Y
  K. DESCR
  L. RULES
  M. CREATE_DATE XI. DAT_BATCH: This table defines batches of documents which were processed during a DAT session.
  A. **DAT_BATCH_NO
  B. **DAT_SESSION_NO
  C. **DAT_SESSION_DATE
  D. **DAT_TERMINAL_ID
  E. DAT_UNIT_CNT
  F. CREATE_DATE XII. DAT_UNIT: This table defines the unit in a batch of documents which were processed in a DAT session.
  A. **DAT_UNIT_NUM
  B. **DAT_BATCH_NO
  C. **DAT_SESSION_NO
  D. **DAT_SESSION_DATE
  E. **DAT_TERMINAL_ID
  F. FORM_CNT
  G. DOC_CNT
  H. CREATE_DATE XIII. DAT_DOC: This table defines documents in the unit of documents which were processed in a DAT session.
  A. **DAT_DOC_NO
  B. **DAT_UNIT_NUM
  C. DOC_RECORD_DATA
  D. CREATE_DATE The DATA_SPEC, DATA_SPEC_FIELD, TEMPL_DOC, TEMPL_FORM, TEMPL_PANEL and TEMPL_FIELD tables implement the document partitioning algorithm mentioned above in the discussion of the sample receipt of FIG. 3b. The cross product of the DATA_SPEC and DATA_SPEC_FIELD tables partition arbitrary documents while the cross product of the TEMPL_DOC, TEMPL_FORM, TEMPL_PANEL and TEMPL_FIELD tables partition predefined documents of the DataTreasury™ System 100. The TEMPL-FORM defines the location of forms on a predefined document. The TEMPL-PANEL defines the location of panels within the forms of a predefined document. Finally, the TEMPL_FIELD table defines the location of fields within the panels of a form of a predefined document.

The DPC 600 performs data mining and report generation for a wide variety of applications by returning information from the data base. For example, the DPC 600 generates market trend analysis reports and inventory reports for merchants by analyzing the data from receipts captured by the DAT 200. The DPC 600 also can provide important tax information to the taxpayer in the form of a report or to software applications like tax preparation software by retrieving tax information from the database which originally resided on receipts, documents and electronic transactions captured by the DAT 200. Similarly, the DPC 600 can also provide tax information for particular periods of time for a tax audit.

Figure 7:
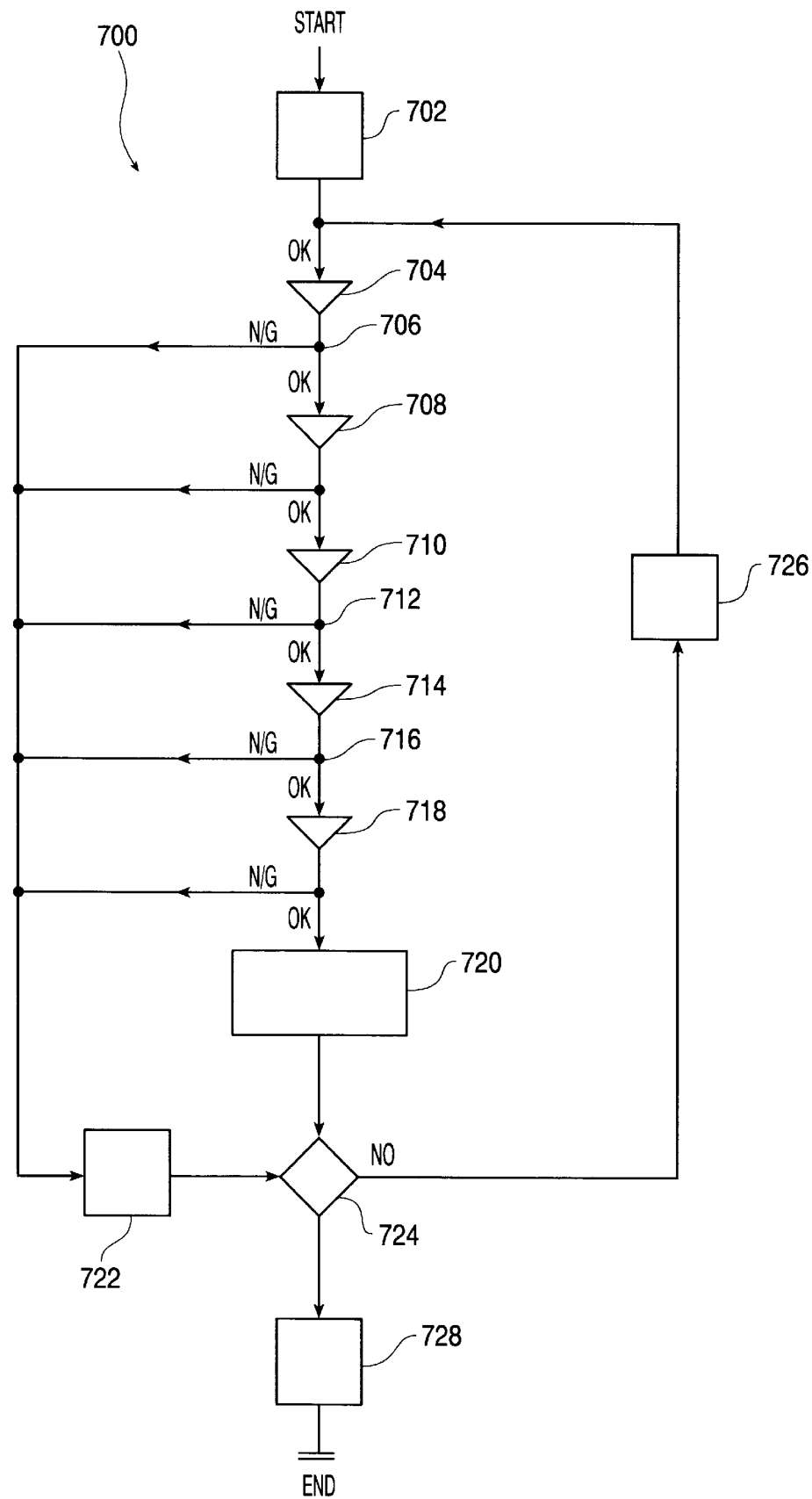
FIG. 7 is a flow chart describing the polling of the DACs by the DPC.

FIG. 7 is a flow chart 700 describing the polling of the DACs 300 by a DPC 600 and the transmission of the TECBIs from the DACs 300 to the DPC 600. In step 702, the DPC 600 reads the address of the first DAC 300 in its region for polling. In step 704, the DPC 600 connects with a DAC 300 for transmission. The DPC 600 determines whether the connection to the DAC 300 was successful in step 706. If the call to the DAC 300 was unsuccessful, the DPC 600 will record the error condition in the session summary report and will report the error to the DPC 600 manager in step 722.

If the connection to the DAC 300 was successful, the DPC 600 will verify that the DAC 300 is ready to transmit in step 708. If the DAC 300 is not ready to transmit, the DPC 600 will record the error condition in the session summary report and will report the error to the DPC 600 manager in step 722.

If the DAC 300 is ready to transmit in step 708, the DAC 300 will transmit a TECBI packet header to the DPC 600 in step 710. The DPC 600 will determine whether the transmission of the TECBI packet header was successful in step 712. If the transmission of the TECBI packet header was unsuccessful, the DPC 600 will record the error condition in the session summary report and will report the error to the DPC 600 manager in step 722.

If the transmission of the TECBI packet header was successful in step 712, the DAC 300 will transmit a TECBI packet to the DPC 600 in step 714. The DPC 600 will determine whether the transmission of the TECBI packet was successful in step 716. If the transmission of the TECBI packet header was unsuccessful, the DPC 600 will record the error condition in the session summary report and will report the error to the DPC 600 manager in step 722.

If the transmission of the TECBI packet was successful in step 716, the DPC 600, in step 718, will compare the TECBI packet header transmitted in step 710 to the TECBI packet transmitted in step 714. If the TECBI packet header does not match the TECBI packet, the DPC 600 will record the error condition in the session summary report and will report the error to the DPC 600 manager in step 722.

If the TECBI packet header matched the TECBI packet in step 718, the DPC 600 will set the status of the TECBI packet to indicate that it was received at the DPC 600 in step 720. The DPC 600 will also transmit the status to the DAC 300 to indicate successful completion of the polling and transmission session in step 720. Next, the DPC 600 will determine whether TECBIs have been transmitted from all of the DACs 300 in its region in step 724. If all DACs 300 in the DPC's 600 region have transmitted TECBIs to the DPC 600, the DPC 600 will compile a DAC 300 status report in step 728 before terminating the session.

If one or more DACs 300 in the DPC's 600 region have not transmitted TECBIs to the DPC 600, the DPC 600 will get the address of the next DAC 300 in the region in step 726. Next, control returns to step 704 where the next DAC 300 in the DPC's 600 region will be polled as previously discussed.

Figure 8:
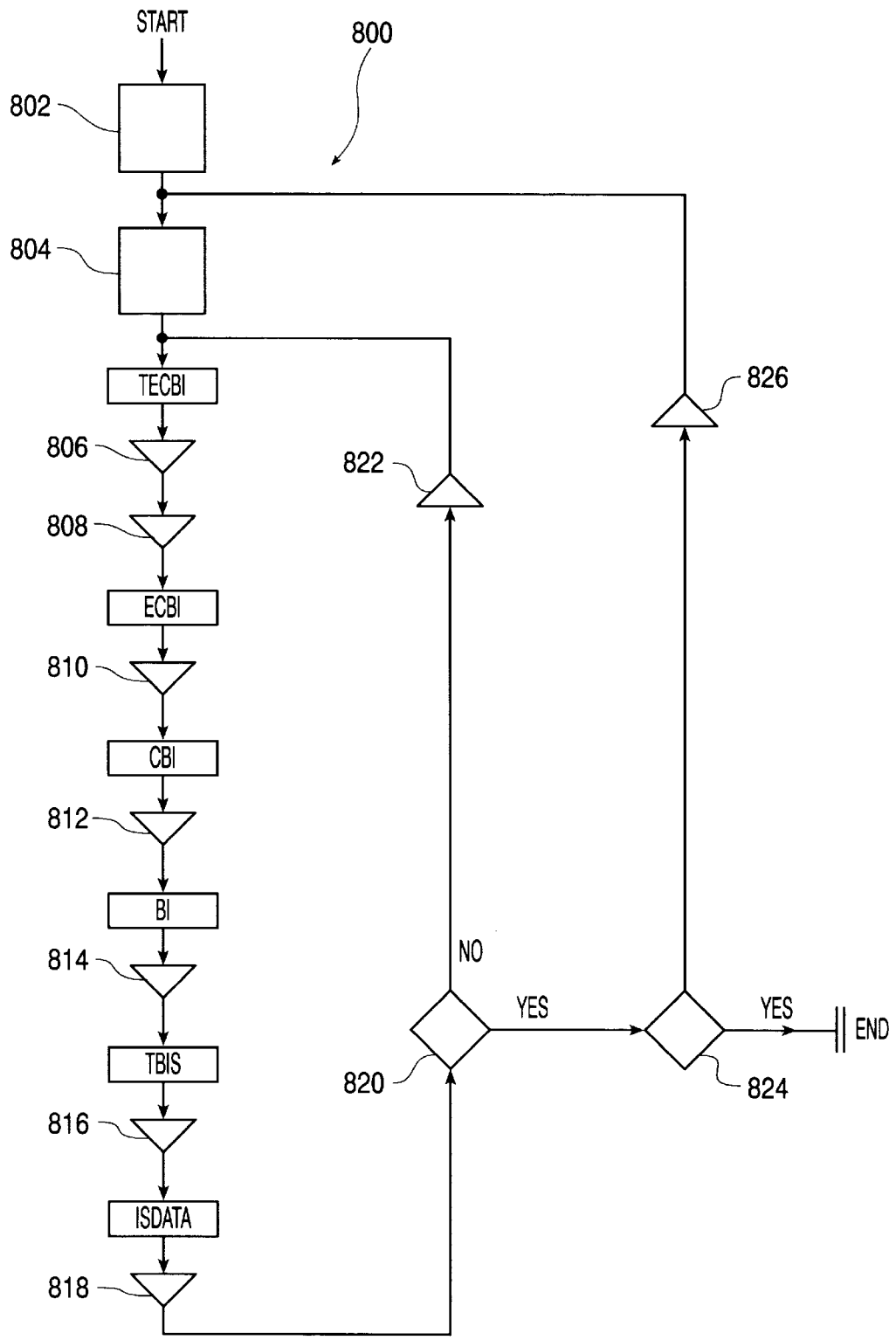
FIG. 8 is a flow chart describing the data processing performed by the DPC.

FIG. 8 is a flow chart 800 describing the data processing performed by the DPC 600. In step 802, the DPC 600 fetches the first TECBI packet. Next, the DPC 600 extracts the first TECBI from the TECBI packet in step 804. In step 806, the DPC 600 inserts the TECBI into the database. In step 808, the DPC 600 extracts the tag header which includes the customer identifier, the encryption keys and the template identifier from the TECBI to obtain the ECBI.

In step 810, the DPC 600 decrypts the ECBI image to obtain the CBI. In step 812, the DPC 600 uncompresses the CBI to obtain the BI. In step 814, the DPC 600 fetches and applies the BI template against the BI. Further the DPC 600 divides the BI into image snippets and tags the BI template with data capture rules in step 814 to form the Tagged Bitmap Image Snippets (TBIS). In step 816, the DPC 600 submits the TBISs for data capture operations to form the IS Derived Data Record (ISDATA). The DPC 600 discards the TBISs upon completion of the data capture operations in step 816. In step 818, the DPC 600 updates the TECBI record in the database with the IS Derived Data.

In step 820, the DPC 600 determines whether it has processed the last TECBI in the TECBI packet. If the last TECBI in the TECBI packet has not been processed, the DPC 600 extracts the next TECBI from the TECBI packet in step 822. Next, control returns to step 806 where the next TECBI will be processed as described above.

If the last TECBI in the TECBI packet has been processed, the DPC 600 determines whether the last TECBI packet has been processed in step 824. If the last TECBI packet has not been processed, the DPC 600 fetches the next TECBI packet in step 826. Next, control returns to step 804 where the next TECBI packet will be processed as described above. If the last TECBI packet has been processed in step 824, the DPC 600 terminates data processing.

As is known to persons of ordinary skill in the art, a user can request information from a relational database using a query language. See, e.g., Chapter Three of Database System Concepts by Korth and Silberschatz. For example, a user can retrieve all rows of a database table having a primary key with particular values by specifying the desired primary key's values and the table name on a select operation. Similarly, a user can retrieve all rows from multiple database tables having primary keys with particular values by specifying the desired primary keys' values and the tables with a select operation.

Figure 9:
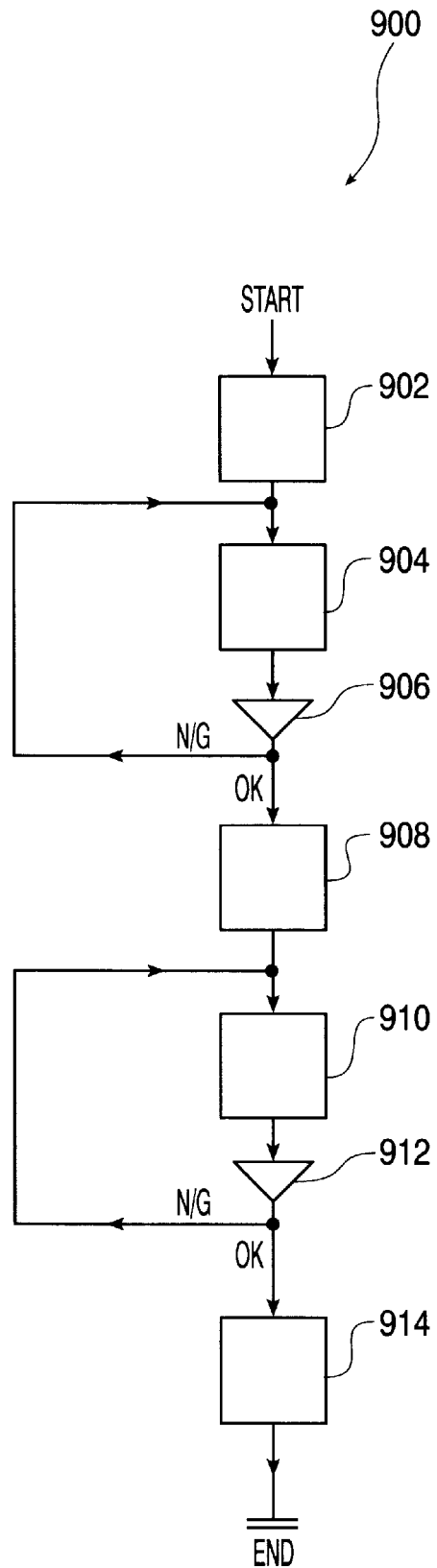
FIG. 9 is a flow chart describing the data retrieval performed by the DPC.

The DataTreasury™ System provides a simplified interface to its retrieval customers to enable data extraction from its relational database as described in FIG. 9. For example, a DataTreasury™ System customer can retrieve the time, date, location and amount of a specified transaction.

The DPC 600 performs data mining and report generation for a wide variety of applications by returning information from the data base. For example, the DPC 600 generates market trend analysis reports and inventory reports for merchants by analyzing the data from receipts captured by the DAT 200. The DPC 600 also can provide important tax information to the taxpayer in the form of a report or to tax preparation software by retrieving tax information from the database which originally resided on receipts, documents and electronic transactions captured by the DAT 200. Similarly, the DPC 600 can also provide tax information for particular periods of time for a tax audit.

FIG. 9 is a flowchart 900 describing the data retrieval performed by the DPC 600. In step 902, the DPC 600 receives a TECBI retrieval request. In step 904, the DPC 600 obtains the customer identifier. In step 906, the DPC 600 determines whether the customer identifier is valid. If the customer identifier is not valid, control returns to step 904 where the DPC 600 will obtain another customer identifier.

If the customer identifier is valid in step 906, the DPC 600 will obtain the customer security profile in step 908. In step 910, the DPC 600 receives a customer retrieval request. In step 912, the DPC 600 determines whether the customer retrieval request is consistent with the customer security profile. If the customer retrieval request is not consistent with the customer security profile, control returns to step 910 where the DPC 600 will obtain another customer retrieval request. If the customer retrieval request is consistent with the customer security profile, the DPC 600 will transmit the results to the customer as indicated by the customer security profile in step 914.

While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A system for central management, storage and report generation of remotely captured paper transactions from documents and receipts comprising:

one or more remote data access subsystems for capturing and sending paper transaction data and subsystem identification information comprising at least one imaging subsystem for capturing the documents and receipts and at least one data access controller for managing the capturing and sending of the transaction data;

at least one central data processing subsystem for processing, sending, verifying and storing the paper transaction data and the subsystem identification information comprising a management subsystem for managing the processing, sending and storing of the of the transaction data; and at least one communication network for the transmission of the transaction data within and between said one or more data access subsystems and said at least one data processing subsystem, with the data access subsystem providing encrypted subsystem identification information and encrypted paper transaction data to the data processing subsystem.

2. A system as in claim 1 wherein said one or more data access subsystems further comprise at least one scanner for capturing the paper transaction data.

3. A system as in claim 2 wherein said one or more data access subsystems also capture electronic transactions from credit cards, smart cards and debit cards, signature data or biometric data, further comprising:

at least one card interface for capturing the electronic transaction data;

at least one signature interface for capturing an electronic signature; and at least one biometric interface for capturing biometric data.

4. A system as in claim 3 wherein said at least one data access controller successively transforms the captured transaction data to a bitmap image, a compressed bitmap image, an encrypted, compressed bitmap image and an encrypted, compressed bitmap image tagged with information identifying a location and time of the transaction data capture.

5. A system as in claim 4 wherein said one or more data access subsystems further comprise digital storage for storing the tagged, encrypted, compressed bitmap image.

6. A system as in claim 5 wherein said at least one card interface initiates the electronic transaction.

7. A system as in claim 6 wherein said one or more data access subsystems further comprise at least one printer for printing the paper transaction initiated by said at least one card interface.

8. A system as in claim 7 wherein the paper transaction printed by said at least one printer includes data glyphs.

9. A system as in claim 1 wherein said data management subsystem of said at least one data processing subsystem comprises:

at least one server for polling said one or more remote data access subsystems for transaction data;

a database subsystem for storing the transaction data in a useful form;

a report generator for generating reports from the transaction data and providing data to software applications;

at least one central processing unit for managing the storing of the transaction data;

a domain name services program for dynamically assigning one of said at least one server to receive portions of the transaction data for balancing the transaction data among said at least one server; and a memory hierarchy.

10. A system as in claim 9 wherein said at least one server also polls for biometric and signature data, said database stores the biometric data and the signature data, and said at least one central processing unit verifies the biometric data and the signature data.

11. A system as in claim 9 wherein said memory hierarchy comprises at least one primary memory for storage of recently accessed transaction data and at least one secondary memory for storage of other transaction data.

12. A system as in claim 11 wherein said at least one secondary memory comprises at least one write once read many jukebox and at least one optical storage jukebox.

13. A system as in claim 12 wherein said at least one optical storage jukebox comprises read only memory technology including compact disc read only memory form factor metallic write once read many disc.

14. A system as in claim 9 wherein said database subsystem comprises at least one predefined template for partitioning the stored transaction data into panels and identifying locations of the panels.

15. A system as in claim 14 wherein said data processing subsystem further comprises a data entry gateway for correcting errors in the panels of stored transaction data.

16. A system as in claim 1 wherein said at least one communication network comprises:

at least one first local area network for transmitting data within a corresponding one of said one or more remote data access subsystems;

at least one second local area network for transmitting data within a corresponding one of said at least one data processing subsystem; and at least one wide area network for transmitting data between said one or more remote data access subsystems and said at least one data processing subsystem.

17. A system as in claim 16 wherein said at least one communication network further comprises:

at least one modem for connecting said at least one first local area network of said one or more data access subsystems to a corresponding one of said at least one second local area network of said at least one data processing subsystem through said at least one wide area network; and at least one bank of modems for connecting said at least one second local area network of said at least one data processing subsystem to a corresponding some of said at least one first local area network of said one or more data access subsystems through said at least one wide area network.

18. A system as in claim 1 further comprising at least one data collecting subsystem for collecting and sending the electronic or paper transaction data comprising a further management subsystem for managing the collecting and sending of the transaction data.

19. A system as in claim 18 wherein said further data management subsystem of said at least one data collecting subsystem comprises:

at least one server for polling said one or more remote data access subsystems for transaction data;

a database for storing the transaction data in a useful form;

at least one central processing unit for managing the collecting of the transaction data;

a domain name services program for dynamically assigning one of said at least one server to receive portions of the transaction data for balancing the transaction data among said at least one server; and a memory hierarchy.

20. A system as in claim 19 wherein said memory hierarchy comprises at least one primary memory for collecting transaction data and at least one secondary memory for backup storage of the transaction data.

21. A system as in claim 20 wherein said at least one secondary memory comprises at least one DLT jukebox.

22. A system as in claim 18 wherein said at least one communication network comprises:

at least one first local area network for transmitting data within a corresponding one of said one or more remote data access subsystems;

at least one second local area network for transmitting data within a corresponding one of said at least one data collection subsystem;

at least one third local area network for transmitting data within a corresponding one of said at least one data processing subsystem; and at least one wide area network for transmitting data between said one or more remote data access subsystems, said at least one data collection subsystem and said at least one data processing subsystem.

23. A system as in claim 22 wherein said at least one communication network further comprises:

at least one first modem for connecting said at least one first local area network of said one or more data access subsystems to a corresponding one of said at least one second local area network through said at least one wide area network;

at least one bank of modems for connecting said at least one second local area network of said at least one data collection subsystem to a corresponding some of said at least one first local area network of said one or more data access subsystems through said at least one wide area network;

at least one first wide area network router for connecting a corresponding one of said at least one second local area network of said at least one data collecting subsystem to said at least one wide area network; and at least one second wide area network router for connecting a corresponding one of said at least one third local area network of said at least one data processing subsystem to said at least one wide area network.

24. A system as in claim 23 wherein said at least one first wide area network and said at least one second wide area network comprises a carrier cloud, said carrier cloud using a frame relay method for transmitting the transaction data.

25. A system as in claim 22 wherein said at least one second local area network and said at least one third local area network further comprises a corresponding one of at least one network switch for routing transaction data within said at least one second local area network and said at least one third local area network.

26. A method for central management, storage and verification of remotely captured paper transactions from documents and receipts comprising the steps of:

capturing an image of the paper transaction data at one or more remote locations and sending a captured image of the paper transaction data;

managing the capturing and sending of the transaction data;

collecting, processing, sending and storing the transaction data at a central location;

managing the collecting, processing, sending and storing of the transaction data;

encrypting subsystem identification information and the transaction data; and transmitting the transaction data and the subsystem identification information within and between the remote location(s) and the central location.

27. The method as in claim 26 wherein said managing the capturing and sending step comprises the steps of:

successively transforming the captured transaction data to a bitmap image, a compressed bitmap image, an encrypted, compressed bitmap image and an encrypted, compressed bitmap image tagged with information identifying a location and time of the transaction data capturing; and storing the tagged, encrypted, compressed bitmap image.

28. The method as in claim 27 wherein said managing the capturing and sending step also captures electronic transactions from credit cards, smart cards and debit cards, signature data or biometric data, further comprising the steps of:

initiating an electronic transaction;

capturing signature data;

capturing biometric data; and printing a paper transaction with data glyphs for the initiated electronic transaction.

29. A method as in claim 26 wherein:

said capturing and sending step occurs at a plurality of remote locations; and said collecting, processing, sending and storing step occurs at a plurality of central locations.

30. A method as in claim 29 wherein said collecting, processing, sending and storing step comprises the steps of:

polling the remote locations for transaction data with servers at the central locations;

storing the transaction data at the central location in a memory hierarchy, said storing maintains recently accessed transaction data in a primary memory and other transaction data in a secondary memory; and dynamically assigning the servers at the central location to receive portions of the transaction data for balancing the transaction data among the servers; and generating reports from the transaction data and providing data to software applications.

31. A method as in claim 30 wherein said storing the transaction data step comprises the steps of:

partitioning the stored transaction data with predefined templates into panels; and identifying locations of the panels.

32. A method as in claim 31 wherein said managing the collecting, processing, sending and storing of the transaction data step comprises correcting errors in the panels of stored transaction data.

33. A method as in claim 32 further comprising the steps of:

polling the remote locations for captured electronic data, captured signature data and captured biometric data with servers at the central locations; and comparing the captured signature data and the captured biometric data to stored signature data and stored biometric data respectively for identification verification.

34. A method as in claim 32 wherein said transmitting the transaction data step comprises the steps of:

transmitting data within the remote locations;

transmitting data from each remote location to a corresponding central location; and transmitting data within the central locations.

35. A method as in claim 34 wherein said transmitting data from each remote location to a corresponding central location step comprises the steps of:

connecting each remote location to a corresponding central location; and connecting each central location to corresponding remote locations.

36. A method as in claim 29 further comprising the steps of:

collecting and sending the electronic or paper transaction data at intermediate locations;

managing the collecting and sending of the transaction data; and transmitting the transaction data within the intermediate location and between the intermediate locations and the remote locations and the central locations.

37. A method as in claim 36 wherein said managing the collecting and sending step comprises the steps of:

polling the remote locations for transaction data with servers in the intermediate locations;

storing the transaction data in the intermediate locations in a useful form, said storing maintains the transaction data in a primary memory of a memory hierarchy and performs backup storage of the transaction data into a secondary memory of the memory hierarchy; and dynamically assigning the servers to receive portions of the transaction data for balancing the transaction data among the servers.

38. The method as in claim 36 wherein said transmitting the transaction data step comprises the steps of:

transmitting data within the remote locations;

transmitting data from each remote location to a corresponding intermediate location;

transmitting data within the intermediate locations;

transmitting data from each intermediate location to corresponding central locations; and transmitting data within the central locations.

39. A method as in claim 38 wherein said transmitting data from each remote location to corresponding intermediate locations step comprises the steps of:

connecting each remote location to a corresponding intermediate location; and connecting the intermediate locations to corresponding remote locations.

40. A method as in claim 38 wherein said transmitting data from each intermediate location to corresponding central locations comprises the steps of:

connecting each intermediate location to an external communication network; and connecting the corresponding central locations to the communication network.

41. A method as in claim 40 wherein said transmitting data from each intermediate location to corresponding central locations step further comprises the steps of:

packaging the transaction data into frames; and transmitting the frames through the external communication network.

42. A communication network for the transmission of data within and between one or more remote data processing subsystems, at least one intermediate data collecting subsystem and at least one central subsystem forming a tiered architecture wherein each of said at least one central data processing subsystem communicate with a corresponding some of said at least one data collecting subsystem and each of said at least one data collecting subsystem communicate with a corresponding some of said one or more data processing subsystems, said data processing subsystem including an imaging subsystem for capturing images of documents and receipts, comprising:

at least one first local area network for transmitting data within a corresponding one of said one or more remote subsystems;

at least one second local area network for transmitting data within a corresponding one of said at least one intermediate subsystem;

at least one third local area network for transmitting data within a corresponding one of said at least one central subsystem; and at least one wide area network for transmitting data between said one or more remote subsystems, said at least one intermediate subsystem and said at least one central subsystem.

43. A communication network as in claim 42 further comprising:

at least one first modem for connecting said at least one first local area network of said one or more remote subsystems to a corresponding one of said at least one second local area network through said at least one wide area network;

at least one bank of modems for connecting said at least one second local area network of said at least one intermediate subsystem to a corresponding some of said at least one first local area network of said one or more remote subsystems through said at least one wide area network;

at least one first wide area network router for connecting a corresponding one of said at least one second local area network of said at least one intermediate subsystem to said at least one wide area network; and at least one second wide area network router for connecting a corresponding one of said at least one third local area network of said at least one central subsystem to said at least one wide area network.

44. A system as in claim 43 wherein said at least one first wide area network and said at least one second wide area network comprises a carrier cloud which utilizes a frame relay method for transmitting the transaction data.

45. A system as in claim 44 wherein said at least one second local area network and said at least one third local area network further comprises a corresponding one of at least one network switch for routing transaction data within said at least one second local area network and said at least one third local area network; and further wherein said data comprises (a) electronic transactions from credit cards, smart cards and debit cards, signature data or biometric data, or (b) paper transactions from documents and receipts.

46. A method for transmitting data within and between one or more remote subsystems, at least one intermediate subsystem and at least one central subsystem in a tiered manner wherein each of the central subsystems communicate with at least one intermediate subsystem and each of the intermediate subsystems communicate with at least one remote subsystems comprising the steps of:

capturing an image of documents and receipts and extracting data therefrom;

transmitting data within the remote locations;

transmitting data from each remote location to corresponding intermediate location;

transmitting data within the intermediate locations;

transmitting data from each intermediate location to corresponding central locations; and transmitting data within the central locations.

47. A method as in claim 46 wherein said transmitting data from each remote location to corresponding intermediate locations step comprises the steps of:

connecting each remote location to a corresponding intermediate location; and connecting the intermediate locations to corresponding remote locations.

48. A method as in claim 47 wherein said transmitting data from each intermediate location to corresponding central locations comprises the steps of:

connecting each intermediate location to an external communication network; and connecting the corresponding central locations to the external communication network.

49. A method as in claim 48 wherein said transmitting data from each intermediate location to corresponding central locations step further comprises the steps of:

packaging the transaction data into frames; and transmitting the frames through the external communication network.

50. A method as in claim 46 wherein said data is obtained from (a) electronic transactions from credit cards, smart cards and debit cards, signature data or biometric data, or (b) paper transactions from documents and receipts.

* * * * *

UNITED STATES PATENT AND TRADEMARK OFFICE
CERTIFICATE OF CORRECTION

PATENT NO. : 5,910,988
DATED : June 8, 1999
INVENTOR(S) : Claudio R. Ballard

It is certified that error appears in the above-indentified patent and that said Letters Patent is hereby corrected as shown below:

On the title page: item (56) References Cited Delete "4,602,936" and insert --5,602,936--.
On the title page: Abstract Delete"Locations" after the words more remote and insert -- locations --.

Column 4, Line 26: Delete "(DACS)" after the word Collectors and insert --(DACs)--.
Column 9, Line 35: Delete "3i band" after the word in FIG. and insert --3b and--.
Column 23, Line 23: Delete "subsystems" after the word remote and insert --subsystem--.

Signed and Sealed this

Twelfth Day of October, 1999

Attest:

Q. TODD DICKINSON

*Attesting Officer*     *Acting Commissioner of Patents and Trademarks*

(12) EX PARTE REEXAMINATION CERTIFICATE (5957th)
United States Patent
Ballard

(10) Number: US 5,910,988 C1
(45) Certificate Issued: Oct. 23, 2007

(54) REMOTE IMAGE CAPTURE WITH CENTRALIZED PROCESSING AND STORAGE

(75) Inventor: Claudio R. Ballard, Lloyd Harbor, NY (US)

(73) Assignee: DataTreasury Corporation, Melville, NY (US)

Reexamination Request:
No. 90/007,829, Nov. 25, 2005

Reexamination Certificate for:
| | |
|---|---|
| Patent No.: | 5,910,988 |
| Issued: | Jun. 8, 1999 |
| Appl. No.: | 08/917,761 |
| Filed: | Aug. 27, 1997 |

Certificate of Correction issued Oct. 12, 1999.

(51) Int. Cl.
| | |
|---|---|
| G06K 9/00 | (2006.01) |
| G06K 17/00 | (2006.01) |
| G06Q 20/00 | (2006.01) |
| H04L 9/00 | (2006.01) |

(52) U.S. Cl. .......................................... 705/75
(58) Field of Classification Search ........................ None
See application file for complete search history.

(56) References Cited

U.S. PATENT DOCUMENTS

| | | | |
|---|---|---|---|
| 4,205,780 A | 6/1980 | Burns et al. | |
| 4,264,808 A | 4/1981 | Owens et al. | |
| 4,268,715 A | 5/1981 | Atalla | |
| 4,321,672 A | 3/1982 | Braun et al. | |
| 4,404,649 A | 9/1983 | Nunley et al. | |
| 4,652,990 A | 3/1987 | Pailen et al. | |
| 4,675,815 A | 6/1987 | Kuroki et al. | |
| 4,723,283 A | 2/1988 | Nagasawa et al. | |
| 4,745,267 A | 5/1988 | Davis et al. | |

(Continued)

FOREIGN PATENT DOCUMENTS

| | | |
|---|---|---|
| CA | 2131667 | 6/1995 |
| EP | 0593209 A | 4/1994 |
| EP | 0661654 A2 | 7/1995 |
| WO | WO 90/04837 A | 5/1990 |
| WO | WO 91/06058 A | 5/1991 |
| WO | WO 97/07468 | 2/1997 |
| WO | WO 97/22060 | 6/1997 |
| WO | WO 98/47100 A | 10/1998 |
| WO | WO 98/58356 A | 12/1998 |

OTHER PUBLICATIONS

"About FSTC: FSTC History," FSTC, 2003.
American National Standard For Financial Image Interchange ("ANSI"): Architecture, Overview and System Design Specification, X9.xx 0.7, dated: 1994.
Anderson, "Electronic Check and Check Law," letter to Robert Ballen, Apr. 8, 1996.

(Continued)

*Primary Examiner*—Peter C. English

(57) ABSTRACT

A system for remote data acquisition and centralized processing and storage is disclosed called the DataTreasury™ System. The DataTreasury™ System provides comprehensive support for the processing of documents and electronic data associated with different applications including sale, business, banking and general consumer transactions. The system retrieves transaction data at one or more remote locations, encrypts the data, transmits the encrypted data to a central location, transforms the data to a usable form, performs identification verification using signature data and biometric data, generates informative reports from the data and transmits the informative reports to the remote location(s). The DataTreasury™ System has many advantageous features which work together to provide high performance, security, reliability, fault tolerance and low cost. First, the network architecture facilitates secure communication between the remote location(s) and the central processing facility. A dynamic address assignment algorithm performs load balancing among the system's servers for faster performance and higher utilization. Finally, a partitioning scheme improves the error correction process.

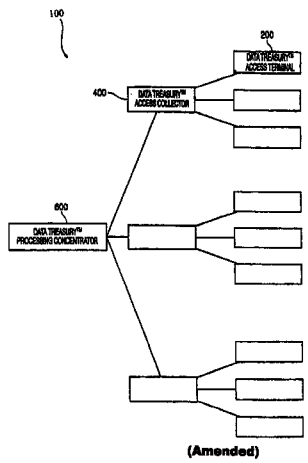

(Amended)

U.S. PATENT DOCUMENTS

| | | |
|---|---|---|
| 4,748,557 A | 5/1988 | Tamada et al. |
| 4,755,940 A | 7/1988 | Brachtl et al. |
| 4,757,543 A | 7/1988 | Tamada et al. |
| 4,771,460 A | 9/1988 | Tamada et al. |
| 4,858,121 A | 8/1989 | Barber et al. |
| 4,882,779 A | 11/1989 | Rahtgen |
| 4,910,774 A | 3/1990 | Barakat |
| 4,922,503 A | 5/1990 | Leone |
| 4,941,125 A | 7/1990 | Boyne |
| 4,961,142 A | 10/1990 | Elliott et al. |
| 4,962,531 A | 10/1990 | Sipman et al. |
| 4,977,595 A | 12/1990 | Ohta et al. |
| 4,985,921 A | 1/1991 | Schwartz |
| 5,003,594 A | 3/1991 | Shinagawa |
| 5,014,311 A | 5/1991 | Schrenk |
| 5,016,277 A | 5/1991 | Hamilton |
| 5,053,607 A | 10/1991 | Carlson et al. |
| 5,054,096 A | 10/1991 | Beizer |
| 5,081,680 A | 1/1992 | Bennett |
| 5,123,047 A | 6/1992 | Rosenow |
| 5,159,548 A | 10/1992 | Caslayka |
| 5,163,098 A | 11/1992 | Dahbura |
| 5,168,444 A | 12/1992 | Cukor et al. |
| 5,170,466 A | 12/1992 | Rogan et al. |
| 5,175,766 A | 12/1992 | Hamilton |
| 5,185,798 A | 2/1993 | Hamada et al. |
| 5,195,133 A | 3/1993 | Kapp et al. |
| 5,200,993 A | 4/1993 | Wheeler |
| 5,214,697 A | 5/1993 | Saito |
| 5,233,656 A | 8/1993 | Langrand et al. |
| 5,235,433 A | 8/1993 | Clarkson et al. |
| 5,241,600 A | 8/1993 | Hillis |
| 5,256,863 A | 10/1993 | Ferguson et al. |
| 5,259,025 A | 11/1993 | Monroe et al. |
| 5,274,567 A | 12/1993 | Kallin |
| 5,287,497 A | 2/1994 | Behera |
| 5,317,637 A | 5/1994 | Pichlmaier et al. |
| 5,321,816 A | 6/1994 | Rogan et al. |
| 5,326,959 A | 7/1994 | Perazza |
| 5,337,358 A | 8/1994 | Axelrod et al. |
| 5,341,428 A | 8/1994 | Schatz |
| 5,343,529 A | 8/1994 | Goldfine et al. |
| 5,373,550 A | 12/1994 | Campbell et al. |
| 5,396,558 A | 3/1995 | Ishiguro et al. |
| 5,408,531 A | 4/1995 | Nakajima |
| 5,440,634 A | 8/1995 | Jones et al. |
| 5,446,796 A | 8/1995 | Ishiguro et al. |
| 5,454,575 A | 10/1995 | Del Buono |
| 5,473,143 A | 12/1995 | Vak et al. |
| 5,484,988 A | 1/1996 | Hills et al. |
| 5,502,765 A | 3/1996 | Ishiguro et al. |
| 5,506,691 A | 4/1996 | Bednar |
| 5,524,073 A | 6/1996 | Stambler |
| 5,528,705 A | 6/1996 | Reasoner, Jr. et al. |
| 5,539,822 A | 7/1996 | Lett |
| 5,539,825 A | 7/1996 | Akiyama et al. |
| 5,544,043 A | 8/1996 | Miki |
| 5,544,255 A | 8/1996 | Smithies et al. |
| 5,557,518 A | 9/1996 | Rosen |
| 5,577,121 A | 11/1996 | Davis et al. |
| 5,596,642 A | 1/1997 | Davis et al. |
| 5,602,936 A | 2/1997 | Green et al. |
| 5,604,802 A | 2/1997 | Holloway |
| 5,608,800 A | 3/1997 | Hoffmann et al. |
| 5,615,269 A | 3/1997 | Micali |
| 5,621,796 A | 4/1997 | Davis et al. |
| 5,621,797 A | 4/1997 | Rosen |
| 5,623,547 A | 4/1997 | Jones et al. |
| 5,625,694 A | 4/1997 | Lee et al. |
| 5,629,981 A | 5/1997 | Nerlikar |
| 5,633,930 A | 5/1997 | Davis et al. |
| 5,642,419 A | 6/1997 | Rosen |
| 5,659,616 A | 8/1997 | Sudia |
| 5,668,897 A | 9/1997 | Stolfo |
| 5,682,549 A | 10/1997 | Tanaka et al. |
| 5,708,810 A | 1/1998 | Kern et al. |
| 5,754,673 A | 5/1998 | Brooks |
| 5,760,916 A | 6/1998 | Dellert et al. |
| 5,784,610 A | 7/1998 | Copeland, III et al. |
| 5,790,260 A | 8/1998 | Meyers |
| 5,832,463 A | 11/1998 | Funk |
| 5,832,464 A | 11/1998 | Houvener et al. |
| 5,857,034 A | 1/1999 | Tsuchiya et al. |
| 5,870,725 A | 2/1999 | Bellinger et al. |
| 5,884,271 A | 3/1999 | Pitroda |
| 5,926,288 A | 7/1999 | Dellert et al. |
| 5,930,778 A | 7/1999 | Geer |
| 5,973,731 A | 10/1999 | Schwab |
| 6,032,137 A | 2/2000 | Ballard |
| 6,108,104 A | 8/2000 | Tesavis |
| 6,115,509 A | 9/2000 | Yeskel |
| 6,145,738 A | 11/2000 | Stinson et al. |

OTHER PUBLICATIONS

Ansi6v4[1].ppt—PowerPoint Presentation—FSTC—Financial Services Technology Consortium, Sep. 30 to Oct. 1, 1996.

"AT&T Global offers one–step imaging," American Banker, vol. 159, No. 39, p. 14A(1), Feb. 28, 1994.

"AT&T Partners with Fiserv to Form Single Source Provider for Leading Image Item Processing Solutions," PR Newswire, at 913CL011, Sep. 13, 1995.

ATZEL, (email to Hambro, Oct. 9, 2001).

"At Your Service . . . ," Federal Reserve Bank of Kansas City, 1995.

"Baby boomers, Generation X are both addicted to ATM," AT&T News Release, Feb. 28, 1995.

"BancTec Inc. has received another order for its image statement processing product (First National Bank of Chicago orders)," Nov. 13, 1991.

BancTec's Proposal to the Federal Reserve Bank of Boston, "Technical Volume: Check Image Processing Archive and Retrieval System," Jul. 8, 1994, JPMC–BANCT 002960–003299 and JPMC–BANCT 001017–001144.

Banet, B., "Document image processing, 1991: The imaging edge," Seybold Rep. on Publishing Systs, vol. 20, No. 19, Jun. 24, 1991.

"Bank Automation News," Finance & Banking Newsletter, vol. 9, Iss. 6, Apr. 2, 1997.

"Banks to Check Out Imaging (Solutions)," Communications Week International, 1992, No. 093, p. 46, Oct. 19, 1992.

Barhel, M., "NCR and Unisys exchange check images in a pivotal test (computer makers test compatibility of check imaging systems)," American Banker, vol. 158, No. 67, p. 3(1), Apr. 8, 1993.

Barthel, Matt, "Unisys, Banctec offer PC–based imaging: high–tech check statements produced; community banks are market," American Banker, vol. 157, No. 195, p. 3(1), Oct. 8, 1992.

Bartholomew, D., "More Checks on Checks—Bank of America plan to convert to an IBM imaging system that screens checks faster and more thoroughly (spotlight)," Informationweek, 1994, No. 504, p. 32, Dec. 5, 1994.

"Bill Processing: US West Re–Engineers with $7.2 Million Unisys Image–based Remittance Processing Solution," EDGE, on & about AT&T, vol. 10, No. 378, Oct. 23, 1995.
Blankenhorn, D., "Cincinnati Bell and Unisys go into bank imaging," Newsbytes, p. NEW10240020, Oct. 24, 1990.
Block, V., "USAA Federal gets imaging system," American Banker, vol. 159, No. 49, p. 6A(1), Mar. 14, 1994.
Booker, E., "Bank to test scalable NCR imaging for check processing," Computerworld, p. 66, Dec. 14, 1992.
Brown, J., "Imaging may dramatically alter bank data networks," Network World, vol. 6, No. 19, p. 6(2), May 15, 1989.
Buchok, J., "OCR gets processing credit," Computing Canada, vol. 19, No. 26, Dec. 20, 1993.
"Chase's New Image," Information Week, No. 517, at 14, Mar. 6, 1995.
Check[1].ptt—PowerPoint Presentation—Current Check Flow, Dec. 12, 1995.
"Check Image Exchange Project (a.ka. Interbank Check Imaging Project)," at www.fstc.org/projects/imaging/index.cfm.
"Check–Image Interchange Inches Closer," Bank Technology News, vol. 10, No. 1, p. 19+, Jan. 1997.
"Checks & Checking: Check Imaging at the Teller Station (Alliance Integration & Services Introduces Imaging System that can be Installed at Bank Teller Stations)," Bank Technology News, vol. 9, No. 10, at 37, Oct. 1996.
"Chemical Chooses IBM Check Imaging (Chemical Banking Corp to install IBM's Image Plus High Performance Transaction System to process 9 mil checks daily)," Bank Technology News, vol. 8, No. 9, p. 11, Sep. 1995.
"Cincinnati Bell: CBIS & Unisys in Major Imaging Agreement," EDGE, on & about AT&T, vol., 5, No. 118, Oct. 29, 1990.
"Cincinnati Bell Information Systems (Integrator Briefs)," Computer Reseller News, 1993, No. 534, p. 129, Jul. 12, 1993.
Complaint in *DataTreasury Corp.* v. *Bank One Corp.*, Cause No. 3–03CV0059–K, In the United States District Court for the Northern District of Texas, Dallas Division.
Complaint in *DataTreasury Corp.* v. *First Data Corporation, et al.*, Cause No. 502CV094, In the United States District Court for the Eastern District of Texas, Texarkana Division.
Complaint in *Data Treasury Corp.* v. *RDM Corp., a.k.a. Research Development and Manufacturing Corp.*, Cause No. 3–02CV2641–M, in the United States District Court for the Northern District of Texas, Dallas Division.
Complaint in *DataTreasury Corp.* v. *Ingenico S.A., et al.*, Cause No. 502CV095, In the United States District Court for the Eastern District of Texas, Texarkana Division.
Complaint in *DataTreasury Corp.* v. *J.P. Morgan Chase & Co., et al.*, Cause No. 502CV124, In the United States District Court for the Eastern District of Texas, Texarkana Division.
"Computerm Announces Remote Check Imaging Support for VMC 8200 High–Speed Channel Extension System," PR Newswire at 408LAM012, Apr. 8, 1996.
"Computerm Eases Remote Imaging," American Banker, vol. 158, No. 156, at 13A(1), Aug. 16, 1993.
"Computerm Enables Boatmen's Bancshares to Execute Remote Check Imaging," PR Newswire at 408LAM013, Apr. 8, 1996.

Cooney, M., "Frame relay comes to Computer extenders," Network World, Jun. 28, 1993.
Cortese, Amy, "Image Yields Interest at Banks (Collaboration Results in Imaging System to Automate Check Processing," ComputerWorld, at 6, Mar. 19, 1990.
Costanzo, C., "As Banks Cling to the Conventional, Check–Imaging Struts Its Stuff," Bank Technology News, p. 1, Mar. 1994.
Crockett, B., "Systematics to use deposited–check imaging; installation at firm's N.J. center would be the first to outsourcer," American Banker, vol. 158, No. 95, p. 3(1), May 19, 1993.
Crone, "Reducing Data Processing Costs with a Remote Item Processing System," Bank Administration, Oct. 1986, pp. 44–46.
Daly, B., "Unisys Acquires Visual Impact Solution for Check Processing, Archive and Image Delivery," Business Wire, p. 9181204, Sep. 18, 1997.
Daly, B., "Unisys provides services to Bank of the West to support retail banking," Business Wire, p. 9180098, Sep. 18, 1995.
"Data Compression Over Frame Relay Implementation Agreement FRF.9," Jan. 22, 1996, downloaded at http://www.frforum.com/5000/Approved/FRF.9/frf9.pdf.
"Defendants' Final Invalidity Construction Pursuant to Fourth Amended Docket Control Order and Patent Local Rules 3–3 and 3–6," pp. 1–21, Civil Action No. 5:03–CV–039 (DF), Dec. 13, 2005.
"Defendants Ingenico S.A. and Ingenico, Inc.'s Preliminary Invalidity Contentions," in *DataTreasury Corp.* v. *Ingenico S.A., et al.*, Cause No. 502CV095, In the United States District Court of Texas, Texarkana Division.
"Defendants' Preliminary Invalidity Construction Pursuant to Patent Local Rules 3–3 and 3–4," in *DataTreasury Corp.*, v. *First Data Corporation, et al.*, Cause No. 502CV094, In the United States District Court of Texas, Texarkana Division.
Depompa, Barbara, "IBM Adds Image–Based Check Processing," MIS Week, vol. 11, No. 12, at 12(1), Mar. 19, 1990.
Description of the IBM "3174 Network Processor," Oct. 7, 1992, found on the web at the URL: http://ecc400.com/ibm/controllers/314prod.htm and http://www.commercecomputer.com/3174.html.
Dinan, Painter & Rodite, "ImagePlus High Performance Transaction System," IBM Systems Journal, vol. 20, No. 3, 1990, pp. 421–434.
Document Image Report, IntraFed Touts Remote Services, vol. 6, Issue 25, Dec. 11, 1996.
Dowell, "Security," email to fstc–image, Apr. 27, 1996.
Durham, D., "Broadway & Seymour to Invest in Two Strategic Initiatives," Business Ire, p. 03151248, Mar. 15, 1995.
eCheck: Homepage, 2003.
Electronic Imaging '88—Advanced Printing of Paper Summaries, vol. 1, Anaheim, California, Mar. 1988.
Electronic Imaging '88—Advanced Printing of Paper Summaries, vol. 1, Oct. 3–6, 1988, Boston, MA.
E–mail of May 10, 2006 titled "USPTO Reexam. C.N 90/007,829, Requested Date: Nov. 25, 2005" from "PT" <admin@patentrakker.com>.
"Entrust Encryption and Digital Signature Explained," date unknown.

Evankovitch, S., "Computer earns MCI 'Level 1' approval; Computer's industry exclusive native Frame Relay interface passes test for interoperability with MCI's Frame Relay services," Business Wire, Apr. 12, 1995.

Evans, J., "The end of the paper wait: document imaging (includes related articles on successful document imaging implementations at Borgess Medical Center, the Huntington Internal Medicine Group, the University of Alabama Health Services Foundation and Quest Diagnostic) (Industry Trend or Event)," Health Management Technology, vol. 18, No. 2, p. 16(5), Feb. 1997.

Fassett, W., "Impact of Imaging," Bank Management, vol. 67, No. 11, p. 56, Nov. 1991.

Federal Reserve Bank of Boston, "Request For Proposal For Check Image Processing And Archival And Retrieval Systems For The Federal Reserve," Apr. 21, 1994, JPMC 152558–152803.

Feighery, M., "NCR demonstrates systems for Insurance and accounting industry," AT&T News Release, May 31, 1992.

Feighery, M. and Bochonko, K., "NCR demonstrates full line of retail products at NRF conference," AT&T News Release, Jan. 18, 1993.

FileNet Product Brochure, "Introducing the Age of Document–Image Processing," The PC Connection, and Wide–Area Image Communication and System Networking, 1998, 14 pages.

"Financial EDI over the Internet," Bank of America, 1996.

Financial Services Technology Consortium ("FSTC") Interbank Check Imaging Project White Paper, dated: Jun. 20, 1994.

Fisher, M., "IBM, Customers continue work on document image processor," Datamation, vol. 34, No. 19, Oct. 1, 1988.

Fitch, "Digital image systems speed return items, exceptions," Corporate Cashflow, May 1996.

Fitch, T., "Check image capture speeds up positive pay reconcilement," Corporate Cashflow, Feb. 1995.

Friedman, D., "Nixdorf Computer Introduced DCPA Image—A Sophisticated Document Image Processing System With Unique Capabilities," PR Newswire, Aug. 15, 1989.

FSTC Check Image Interchange Project, dated: May 25, 1995.

FSTC Check Image Interchange Project Pilot Phase 1A: Preliminary Architecture and Project Plan, dated: Jun. 30, 1995.

"FSTC Check Image Quality Subproject," date unknown.

FSTC Compilation of ANSI X9.46, Data Structure Reference, dated: Jul. 31, 1995.

"FSTC Demonstrate Interbank Check Image Pilot; Multi–Vendor Sysetm Speeds check Clearing, Cuts Fraud—FSTC Pilot Lays Foundation for Paper Check Truncation," at www.fstc.org/projects/imageing/public/information.cfm, Dec. 12, 1995.

"FSTC Image Exchange," May 21, 1996.

FSTC Image Quality Functional Requirements, dated: Jul. 26, 1995.

FSTC Interbank Check Imaging: Unisys Monthly Status Report, Jun. 26, 1996.

"FSTC Interbank check Imaging: Unisys Monthly Status Report," Jul. 22, 1996.

FSTC Pilot Overview, dated: Apr. 3, 1995.

"FSTC: Projects—Check Image Exchange Project—Project Participants," at www.fstc.org/projects/imaging/participants.cfm.

FSTC Projects: The Bank Internet Payment System (BIPS): Leading the Way to Electronic Commerce, FSTC, 2003.

Garvey, M., "Check Processing Goes Digital—Chase Manhattan Bank to store checks electronically, saving time and money," Informationweek, 1997, No. 648, p. 20, Sep. 15, 1997.

Gawen, "PC Based Document Image Processing and Signature Verification," Proceedings of the Information & Image Management Conference, 1991, pp. 389–391.

"Global Concepts—Payment Systems Consulting," at www.global–concepts.com/image_archive.htm.

Griffith, M. and Mazzola, J., "National City, NCR form strategic imaging partnership," AT&T News Release, Nov. 9, 1992.

Gullo, K., "NCR, Unisys plan check imaging for IBM Systems," American Banker, vol. 156, No. 249, p. 1(2), Dec. 30, 1991.

Haig, J., "Unisys integrates retail/wholesale lockbox solution for remittance processors," Business Wire, p. 03251075, Mar. 25, 1997.

Haig, J., "Unisys solution will support check processing at Vermont Federal," Business Wire, p. 5201185, May 20, 1996.

Helm, Sylvia, "Banks check into image processing," Computers in Banking, vol. 7, No. 3, p. 25(7), Mar. 1, 1990.

Helm, S., "Who's doing what in image processing (includes definition of image processing," ABA Banking Journal, vol. 83, No. 1, p. 31(3), January, 1991.

"High Volume Data Capture Sans Paper"0 in Bank Systems Technology, May, 1996, p. 35.

Homa, "MICR Technology Helps Eliminate POS Check Fraud," Chain Store Age Executive, Sep. 1991.

Horine, J., "AT&T and Fiserv team to offer imaging solutions," Sep. 13, 1995.

"Huntington BancShares in the Forefront of Technology with Purchase of Unisys Check Imaging System," PR Newswire, p. 1, Oct. 11, 1989.

IBM Electronic Payment Systems Support/Check Processing Control Systems: Progress Reference and Operations Manual, dated: June, 1986.

"IBM FSTC Pilot Status".

IBM Product Announcement 190–040, (IBM 3898 Image Processor), dated: Mar. 13, 1990.

IBM's Proposal to the Federal Reserve Bank of Boston, Nov. 7, 1991, "IBM Proposal For FRB Phase Four: Image Archive System," JPMC 279955–280128, Yeskel Exhibit 1.

IBM Systems Journal, vol. 29, No. 3, 1990 (entire journal).

"IBM X9.46 Pilot Status—Summary," date unknown.

"Ibnamed, A Load Balancing Name Server Written in Perl," Sep. 17, 1995, located at the web at URL www.standford.edu/~schemers/docs/Ibnamed/Ibnamed.html.

"Ibnamed, A Load Balancing Name Server Written in Perl," Oct. 15, 2002, found on the web at the URL www.stanford.edu/~schemers/docs/Ibnamed/Ibnamed.html.

"ICI Project Security Work Session," May 10, 1996.

Image Archive Forum Flow Nos. 1–13, Sep. 1997.

Image Archive Forum Methodology and Value, Sep. 19, 1997.

Image Archive Forum, "Payment Systems Task Force Economic Framework," Jan. 27, 1998.

ImagePlus brochure by IBM, 1991.

"Image Processing Survival Guide, vol. 11: Sure–Fire Strategies for Implementing Image Remittance," Philips Business Information, Inc., 1996.

"Image systems garner NOAC spotlight (American Bankers' Association's National Operations and Automation Conference)," Computer in Banking, vol. 6, No. 7, p. 8(4), Jul., 1989.

"Imaging products. Check Processing—IBM's ImagePlus High Performance Transaction System," United States Banker, vol. 100, No. 8, p. 23(3), Aug. 1990.

"Imaging vendors shape processing," Banking Management, vol. 69, No. 4, p. 29, Apr. 1993.

Imwalle, C. and Pratt, J., "250 U.S. banks to use NCR, Cincinnati Bell financial systems," AT&T News Release, May 4, 1993.

"Industry Security Leader Racal Supports Visa/Mastercard Proposal for Internet," PR Newswire, Apr. 17, 1996.

INSPEC search with abstracts.

"Item processing leaps ahead with VisualImpact and Windows NT (Sponsored Supplement: Unlock Your Bank Office with Microsoft Back Office)," US Banker, vol. 105, No. 6, p. S4(3), Jun. 1995.

Janusky, "FSTC Interbank Check Imaging," Apr. 29, 1996.

Janusky, "FSTC Interbank Check Imaging," May 22, 1996.

Joint Marketing & Referral Agreement Between ACS Image Solutions, Inc. and JPMorgan Chase Bank.

Jones, J., "Broadway & Seymour Announces Client/Server Product for Item and Image Processing," Business Wire, p. 03201186, Mar. 20, 1995.

Jones, J., "Broadway & Seymour announces new VISUAL-IMPACT release," Business Wire, p. 3291274, Mar. 29, 1996.

Klein, M., "Terminal Data to supply NCR with document microfilmers," AT&T News Release, Oct. 13, 1993.

Kraynak Maxfield, J., "Signet Processes Over 2,500 Documents/Hour in Unisys Check Imaging Tests," PR Newswire, p. 0409P8428, Apr. 9, 1991.

Kriskern, J., "Engineering a visionary solution," Datamation, vol. 36, No. 8, Apr. 15, 1990.

Kutler, J., "AT&T, IBM, Unisys join bank research group," American Banker, vol., 159, No. 124, p. 14(1), Jun. 29, 1994.

Lubetkin, S., "Unisys enters image processing market with two new products and major financial and industrial customers (product announcement)," PR Newswire, p. 1011PH009, Oct. 11, 1989.

Mantel, K., "Notes Gets in the Picture," Datamation, Jul. 15, 1992.

Marjanovic, "Payment Groups Square Off Over Electronic Check Plan," American Banker, date unknown.

Marjanovic, S., "Mich. National streamlines imaging with IBM system (check imaging)," American Banker, vol. 160, No. 176, Sep. 13, 1995.

Marjanovic, Steven, "Home Loan Bank to Offer Check–Image Statements to Members' Customers," American Banker, vol. 159, No. 248, at 14(1), Dec. 29, 1994.

Mazzola, J., "NCR and NYCH to develop image–based check notification system," AT&T News Release, Aug. 24, 1992.

Mazzola, J. and Hendrickson, L., "NCR deposit processing technology speeds banking operations," AT&T News Release, Dec. 7, 1992.

Mazzola, J. and Hendrickson, L., "Wachovia tests NCR's new imaging item processing system," AT&T News Release, Nov. 15, 1991.

Mazzola, J., Hendrickson, L. and Gatati, G., "NCR signs DSI alliance for imaging statement processing," AT&T News Release, Jul. 20, 1992.

Mazzola, J., Hendrickson, L., and Waters, R., "NCR, CKI to market image–based credit card chargeback system," Jan. 6, 1993.

Mazzola, J. and O'Donohue, M., "Frost National Bank selects NCR over old mainframe environment," AT&T News Release, Apr. 28, 1993.

McGinn, Janice, "IBM ImagePlus High Performance Transaction System (IBM Harnesses Image Processing to Make its 389x/XP Cheque Processors More Efficient)," Computergram International, No. 1389, at CG103210008, Mar. 21, 1990.

McKee, K., and Gundlach, D., "Retail Banking Solution enhanced," AT&T News Release, May 21, 1990.

Messmer, E., "Hurdles stand in way of electronic banking," Network World, p. 33, Sep. 4, 1995.

"Microsoft Introduces SNA Server Version 3.0, Begins Beta Testing," Microsoft Press Release, Aug. 29, 2006, found at: http://www.microsoft.com/presspass/press/1996/jun96/sna30pr.mspx.

Moore, J., "IBM, Unisys test check systems for Fed Reserve," Federal Computer Week, vol. 6, No. 21, p. 6(2), Jul. 27, 1992.

Moreau, Thierry, "Payment by Authenticated Facsimile Transmission, a Check Replacement Technology for Small and Medium Enterprises," Nov. 25, 2006, found at: http://connotech.com/PAYPROC.HTM.

Morris, H.M. and Orth, R.H., Image system communications, IBM Systems Journal, vol. 29, No. 3, 1990, pp. 371–383.

Murphy, P., "POD Check Imaging Faces Challenges (In 1995, vs. 1996, banks raised Investment in check imaging by 9% from $198 mil and $215 mil; new lost cost POD technology keeps costs down)," Bank Technology News, vol. 10, No. 3, p. 23, Mar. 1997.

"NCReports: Financial Services Trends and Technologies," Issue 1, NCR, Jan. 1997.

"NCReports: Financial Services Trends and Technologies," Issue 2, NCR, Jan. 1997.

"NCReports: Financial Services Trends and Technologies," Issue 3, NCR, Jan. 1997.

"NCReports: Financial Services Trends and Technologies," Issue 4, NCR, Jan. 1997.

"NCReports: Financial Services Trends and Technologies," Issue 5, NCR, Jan. 1997.

"NCReports: Financial Services Trends and Technologies," vol. 1, Issue 6, NCR, Jan. 1997.

"NCReports: Financial Services Trends and Technologies," vol. 1, Issue 7, NCR, 1997.

"NCReports: Financial Services Trends and Technologies," vol. 1, Issue 8, NCR, 1999.

NCR 7780 Brochure, copyrighted 1989.

"NCR—Hardware—7780 Mid–Range Item Processing Transport," at www.ncr.com/products/hardware/hw_7780_product.htm.

"NCR—Hardware—7780, Technical Specifications," at www.ncr.com/products/hardware/nw_7780 ts_product.htm.

"NCR offers new image–based Document Management System," AT&T News Release, Jun. 23, 1992.

"NCR Unveils Client–Server Check Imaging," Bank Technology News, vol. 9, No. 3, p. 23, Mar. 1, 1996.

Nixon, B., "Is check imaging for you? (automation in banking) (includes related article)," Savings & Community Banker, vol. 2, No. 10, p. 28(6), Oct. 1993.

No1016v4[1].ppt—PowerPoint Presentation—FSTC—Interbank Check Image Project, Sep. 30 to Oct. 1, 1996.

"NSSDC's Mass Storage System Evolves," March 1995, found on the web at the URL: http://nssdc.gsfc.nasa.gov/nssdc_news/march95/09_i_behnke_0395.html.

O'Heney, S., "Prepare for the image revolution (Banker and Vendors) (image processing: includes related article listing image processing products) (buyers guide)," Computers in Banking, vol. 6, No. 10, p. 24(6), Oct. 1989.

"On the imaging technology front," American Banker, vol. CLXI, No. 68, p. 26, Apr. 10, 1996.

PACESBusReq3[1].doc—Microsoft Word Doc—"PACES Paperless Automated Check Exchange & Settlement—Business Requirement," Apr. 3, 1998.

PacesOverview40[1].ppt.—PowerPoint Presentation.

PACESPRO[1].doc—Microsoft Word Doc—"PACES Paperless Automated Check Exchange & Settlement—Project Proposal," Apr. 23, 1998.

PACESRequirements[1].doc—Microsoft Word Doc—"PACES Paperless Automated Check Exchange & Settlement—Requirements Document," Apr. 3, 1998.

Plesums, C.A. and Bartels, R. W., Large Scale Image Systems: USAA Case Study, IBM Systems Journal, vol. 29, No. 3, 1990, pp. 343–355.

"Preliminary Invalidity Contentions of Defendants J.P. Morgan Chase & Co. and JPMorgan Chase Bank," in *DataTreasury Corp.* v. *J.P. Morgan Chase& Co., et al.,* Cause No. 502CV124, In the United States District Court for the Eastern District of Texas, Texarkana Division.

"Press Release, Cisco Partners with AT&T on Network Switch Manufacturing," Sep. 26, 1995, found on the web at http://www.lucent.com/press/0995/950926.mma.html.

Press Release, "NCR Document Management System Includes Kodak, Ricoh Products," Apr. 6, 1993.

Press Release, "NCR Introduces Scalable Image Item Processing Solution," Jan. 19, 1996.

"Regions Bank Selects ImageSoft to Provide Image Solutions," Business Wire, at 9161220, Sep. 16, 1997.

Rivest, R.L., Shamir, A., Adleman, L., "A Method for Obtaining Digital Signatures and Public–Key Cryptosystems," date unknown.

Robinson, G., "Universal Card purchases BancTec Image-FIRST system," AT&T News Release, Dec. 22, 1992.

Roldan, Jr., "Image Quality White Paper," FSTC, 1999.

Roldan, M., "Paperless Automated Check Exchange and Settlement (PACBS) (status update) (PACES completes specification and design of image exchange environment and is accepted as part of SVPCO Image Strategy," FSTC, at www.fstc.org/projects/paces/index.cfm, Jun. 22, 2000.

Roldan, Mariano, Financial Services Technology Consortium, "PACES Paperless Automated Check Exchange & Settlement Project Overview, PACES Planning Meeting, New York City," Dec. 19, 1997.

Schwartz, J., "Banks to Test Imaging for Clearing Checks," Communications Week, No. 420, p. 35, Sep. 14, 1992.

Search Report for PCT/US00/33010, Jun. 21, 2002.

Softchec Licenses 'Envision' Image Solution to West Suburban Bank, PR Newswire, at 116SETUU002, Jan. 16, 1996.

"Special Report: Fine Tunning of the Terminal Picture," Computerworld, Aug. 1983.

Spencer, H., "Scanning goes vertical: a big future for specialized check scanning; check scanning technology," Advanced Imaging, No. 10, vol. 12, p. 54, Oct. 1997.

Stellwag, C., "New ATM from AT&T GIS features automated document processing," AT&T News Release, Nov. 29, 1994.

Stellwag, C. and Bochonko, K., "NCR and Cincinnati Bell offer image processing service," AT&T News Release, Jan. 11, 1994.

Stellwag, C. and Bochonko, K., "Norwest Bank selects NCR item processing systems for lockbox," AT&T News Release, Aug. 2, 1993.

Stellwag, C., Graves, T., and Bochonko, K., "New Mexico uses NCR imaging systems for tax, revenue processing," AT&T News Release, Jul. 12, 1993.

Stellwag, C., Proto, J., and Bochonko, K., "CashFlex selects NCR item processing systems for lockbox," AT&T News Release, Jul. 12, 1993.

Stellwag, C., Roedel, R, and Bochonko, K., "NCR and Arkansas Systems announce strategic alliance," AT&T News Release, Jul. 12, 1993.

Stellwag, C., Sanders, G., and Bochonko, K., "NCR and Signet Banking to provide item processing services," AT&T News Release, Jul. 13, 1993.

"SurePOS ACE Electronic Payment Support PRPQ for 4690 OS," Version 1, Release 5, IBM, 1998, 2002.

"The Check Information Age: Vision Executive Summary Image Archive Forum, Payment System Task Force," Jan. 27, 1998.

"The Wachovia Story," Research, Development Manufacturing Corporation, 1993.

Tracey, Brian, "IBM Unveils First Stage of Image–Check System," Computers in Banking, vol. 7, No. 4, at 12(3), Apr. 1990.

Tucker, T., "Broadway rolls out check imaging system for community banks," American Banker, vol. 160, No. 61, p. 14(1), Mar. 30, 1995.

"Understanding EDI," 1996.

"Unisys Enhances Check Imager (Unisys Corp makes effort to appeal to wider range of financial institutions)," American Banker, vol. CLIX, No. 205, p. 15A, Oct. 24, 1994.

Unisys, New York Clearing House, "A Proposal for an Image–Based Return Item Processing System," Jun.1991, Unisys Document No. PDC 1010–16, JPMC–NYCH018091–018216.

"Unisys Wins Contract to Supply Imaging Solution to Chase Manhattan/FISER V Check Processing Alliance," Business Wire, at 6121175, Jun. 12, 1995.

"Unix–Based Image Statement Software," ABA Banking Journal, vol. 85, No. 2, at 80(1), Feb. 1993.

"Verifone Software Links PCs to the Point of Sale," American Banker, vol. 158, No. 156, at 13A(1), Aug. 16, 1993.

Vermeire, "Prosecution of Check Image Patent," letter to Hanna, Jul. 11, 1997.

Wagner, M., "Banc One checks out Web," Computerworld, vol. 30, No. 35, p. 69, Aug. 26, 1996.

Western Bank purchases NCR's Document Managing system, AT&T News Release, Aug. 31, 1993.

BancTec's Proposal to the Federal Reserve Bank of Boston, "Technical Volume: Check Image Processing Archive and Retrieval System," Jul. 8, 1994, JPMC–BANCT 002960–003299.

BancTec's Proposal to the Federal Reserve Bank of Boston, "Technical Volume: Total Solution Overview" Jul. 8, 1994, JPMC–BANCT 001017–001144.

"Interbank Check Imaging," FSTC General Meeting, Orlando, FL, Apr. 17, 1997 (Exhibit 20).

"MAGTEK© Company Background & Product Guide," date unknown (Exhibit MagTek D–7).

"MagTek Unveils Excella, a Dual–side Scanner for Check 21 Applications," May 10, 2004 (Exhibit MagTek D–8).

"PACES Models—FSTC Project," presentation by Mariano Roldan on Jul. 17, 1997 (Exhibit 21).

"PACES Paperless Automated Check Exchange & Settlement Next Step," presentation by John Fricke at New York, NY on Aug. 12, 1997 (Exhibit 19).

Press Release "MagTek Adds Enhanced Reading to Micrimage TM," Jan. 9, 2003 (Exhibit MagTek D–11).

Press Release "MagTek Upgrades Its MicrimageTM Check Reader/Scanner," Jun. 12, 2002 (Exhibit MagTek D–9).

Press Release "MagTek's MICRImage Transmits Check Images at Speed of Ethernet," Feb. 14, 2002 (Exhibit D–10).

"The New Era of Check Scanning Technology," 2005 (Exhibit MagTek D–6).

"Imaging in Corporate Environments: Technology and Communication," Daniel Minoli, McGraw Hill, 1994.

"ANSI/ABA X9.46–1995, Draft version 0.13, American National Standard For Financial Image Interchange: Architecture, Overview and System Design Specification."

"ANSI/ABA X9.46–1997, American National Standard For Financial Image Interchange, Architecture, Overview and System Design Specification." Copyright 1996.

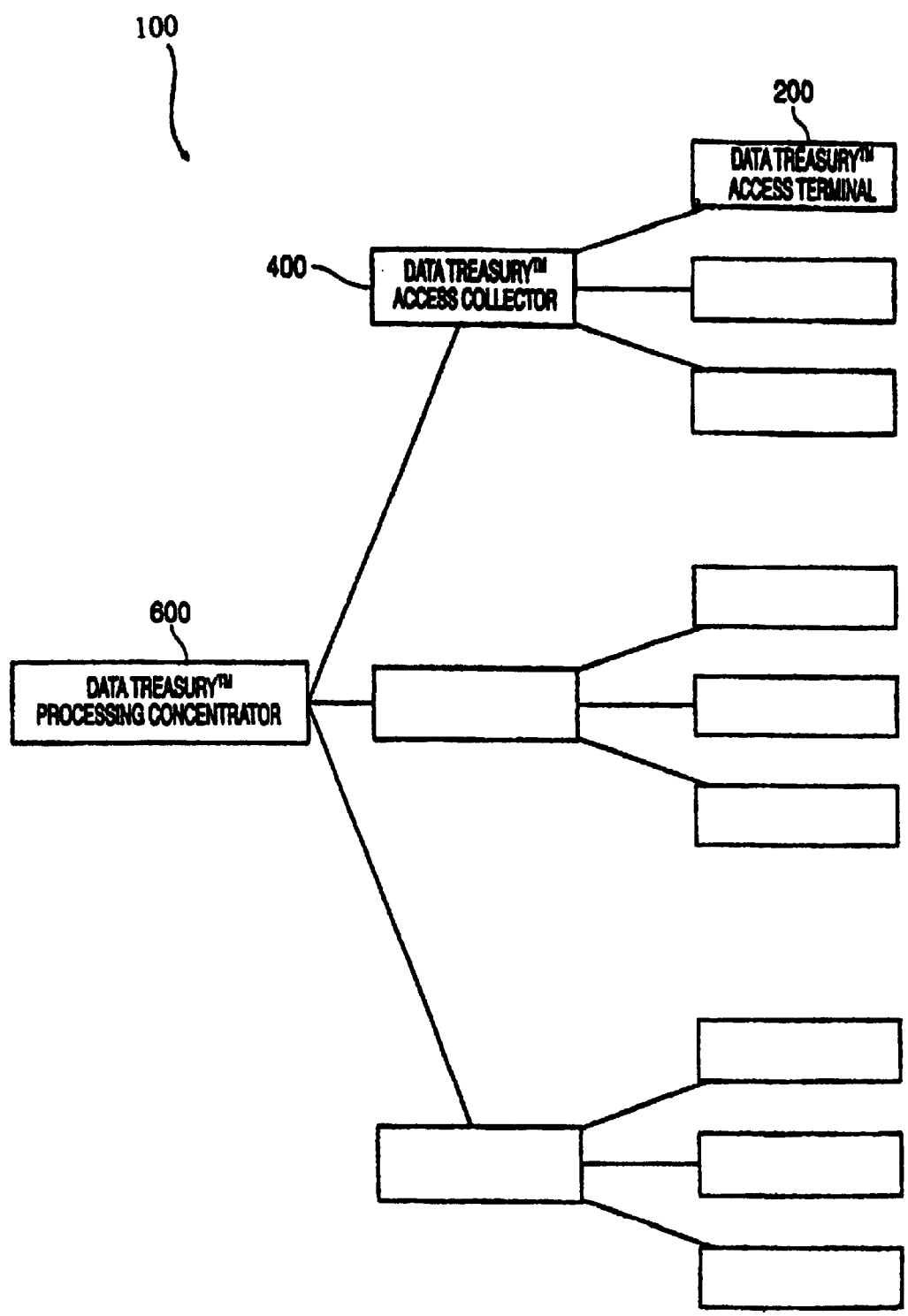
Fig. 1 (Amended)

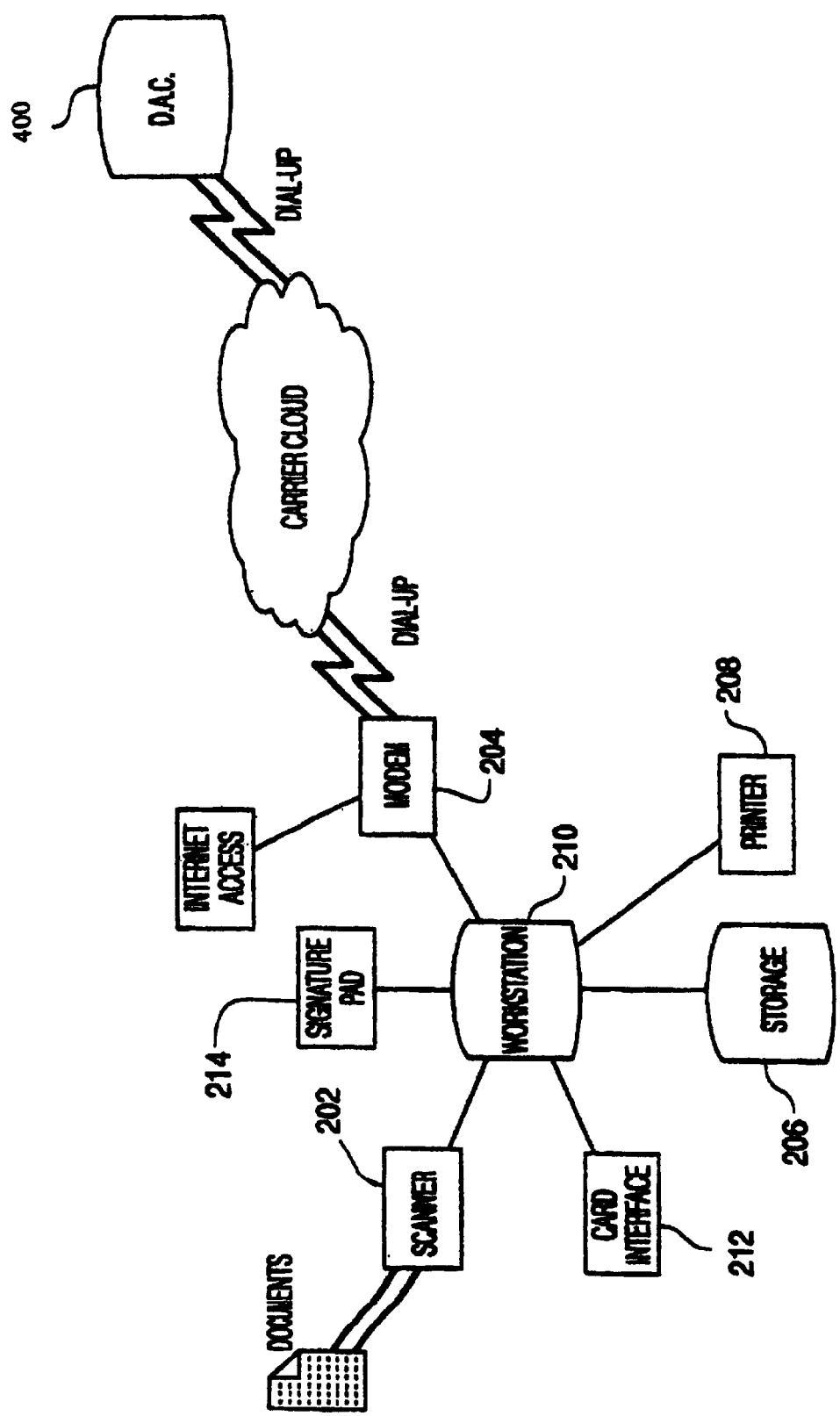
FIG. 2 (Amended)

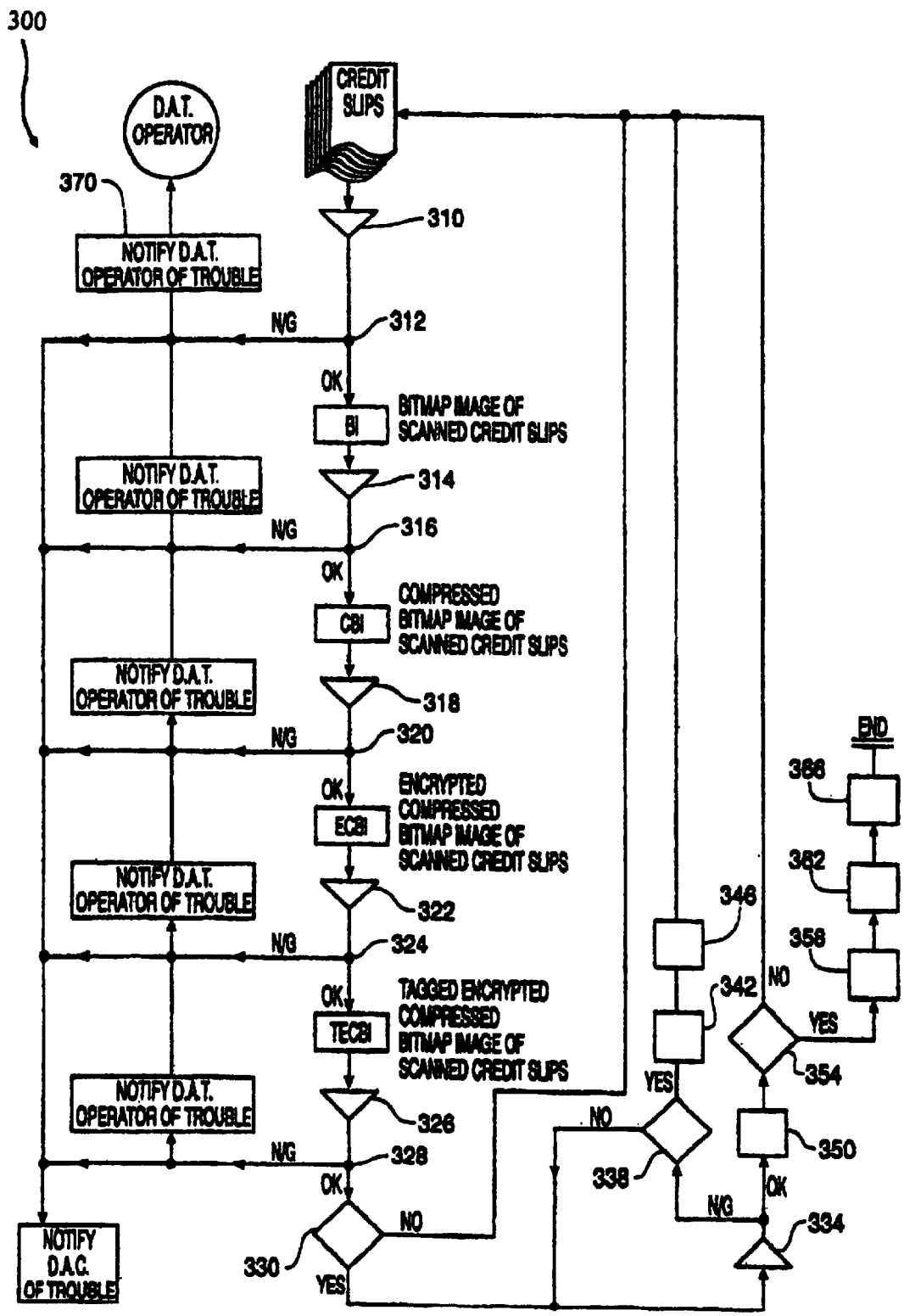
FIG. 3A (Amended)

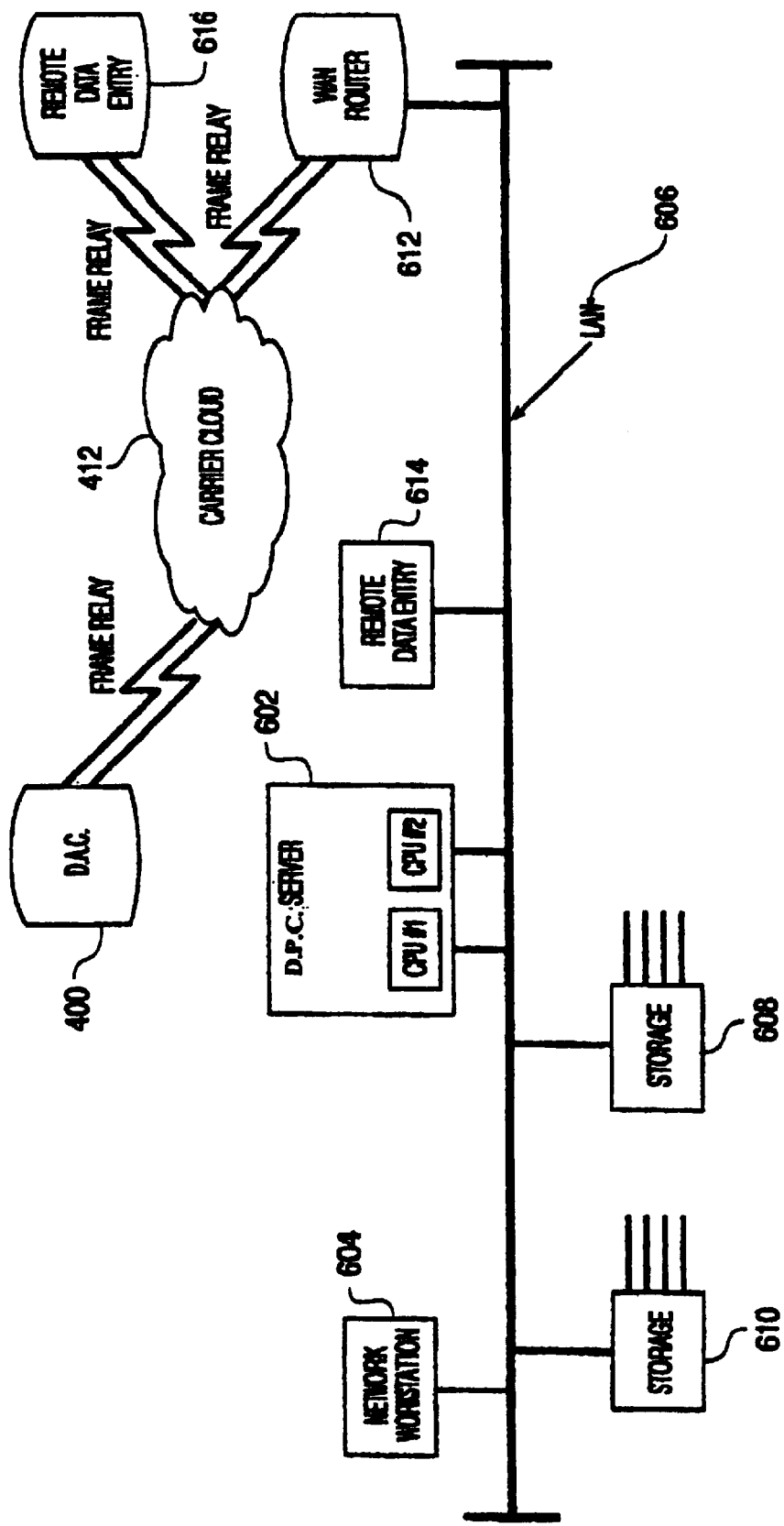
FIG. 6 (Amended)

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, lines 7–19:

The use of glyph technology in the DataTreasury™ System 100 improves the accuracy, cost and performance of the system. Xerox DataGlyph™ Technology includes error correction codes which can be referenced to correct scanning errors or to correct damage to the document caused by ink spills or ordinary wear. DataGlyph™ Technology also leads to decreased system cost since the system will require less manual intervention for data entry and correction because of the improved accuracy associated with DataGlyph™ elements. Since DataGlyph™ elements represent a large amount of information in a small amount of space, the DAT scanner [100] *202* will require a small amount of time to input a large amount of information.

Column 15, lines 53–62:

A DPC LAN 606 facilitates communication among the devices which are connected to the LAN 606 including the DPC server 602 and the network workstation 604. In the preferred embodiment, the DPC LAN 606 uses a switched 100BaseT/10BaseT communication hardware layer protocol like the DAC LAN 406 discussed earlier. In the preferred embodiment, the DPC LAN [406] *606* is a high speed OC2 network topology backbone supporting TCP/IP. The CISCO Catalyst 5500 Network Switch supports the DPC LAN 606 connectivity among the devices connected to the LAN 606.

Column 20, lines 11–20:

FIG. 7 is a flow chart 700 describing the polling of the DACs [300] *400* by a DPC 600 and the transmission of the TECBIs from the DACs [300] *400* to the DPC 600. In step 702, the DPC 600 reads the address of the first DAC [300] *400* in its region for polling. In step 704, the DPC 600 connects with a DAC [300] *400* for transmission. The DPC 600 determines whether the connection to the DAC [300] *400* was successful in step 706. If the call to the DAC [300] *400* was unsuccessful, the DPC 600 will record the error condition in the session summary report and will report the error to the DPC 600 manager in step 722.

Column 20, lines 21–25:

If the connection to the DAC [300] *400* was successful, the DPC 600 will verify that the DAC [300] *400* is ready to transmit in step 708. If the DAC [300] *400* is not ready to transmit, the DPC 600 will record the error condition in the session summary report and will report the error to the DPC 600 manager in step 722.

Column 20, lines 26–33:

If the DAC [300] *400* is ready to transmit in step 708, the DAC [300] *400* will transmit a TECBI packet header to the DPC 600 in step 710. The DPC 600 will determine whether the transmission of the TECBI packet header was successful in step 712. If the transmission of the TECBI packet header was unsuccessful, the DPC 600 will record the error condition in the session summary report and will report the error to the DPC 600 manager in step 722.

Column 20, lines 34–41:

If the transmission of the TECBI packet header was successful in step 712, the DAC [300] *400* will transmit a TECBI package to the DPC 600 in step 714. The DPC 600 will determine whether the transmission of the TECBI packet was successful in step 716. If the transmission of the TECBI packet header was unsuccessful, the DPC 600 will record the error condition in the session summary report and will report the error to the DPC 600 manager in step 722.

Column 20, lines 49–59:

If the TECBI packet header matched the TECBI packet in step 718, the DPC 600 will set the status of the TECBI packet to indicate that it was received at the DPC 600 in step 720. The DPC 600 will also transmit the status to the DAC [300] *400* to indicate successful completion of the polling and transmission session in step 720. Next, the DPC 600 will determine whether TECBIs have been transmitted from all of the DACs [300] *400* in its region in step 724. If all DACs [300] *400* in the DPC's 600 region have transmitted TECBIs to the DPC 600, the DPC 600 will compile a DAC [300] *400* status report in step 728 before terminating the session.

Column 20, lines 60–65:

If one or more DACs [300] *400* in the DPC's 600 region have not transmitted TECBIs to the DPC 600, the DPC 600 will get the address of the next DAC [300] *400* in the region in step 726. Next, control returns to step 704 where the next DAC [300] *400* in the DPC's 600 region will be polled as previously discussed.

THE DRAWING FIGURES HAVE BEEN CHANGED AS FOLLOWS:

Reference number 100 added to FIG. 1.

Reference number 300 changed to 400 in FIG. 2.

Reference number 300 added to FIG. 3A.

Text "D.A.C." changed to "D.P.C." in box 602 of FIG. 6.

AS A RESULT OF REEXAMINATION, IT HAS BEEN DETERMINED THAT:

The patentability of claims 26–50 is confirmed.

Claim 1 is determined to be patentable as amended.

Claims 2–25, dependent on an amended claim, are determined to be patentable.

New claims 51–123 are added and determined to be patentable.

1. A system for central management, storage and report generation of remotely captured paper transactions from documents and receipts comprising:
   one or more remote data access subsystems for capturing and sending paper transaction data and subsystem identification information comprising at least one imaging subsystem for capturing the documents and receipts and at least one data access controller for managing the capturing and sending of the transaction data;
   at least one central data processing subsystem for processing, sending, verifying and storing the paper transaction data and the subsystem identification information comprising a management subsystem for managing the processing, sending and storing [of the] of the transaction data; and at least one communication network for the transmission of the transaction data within and between said one or more data access subsystems and said at least one data processing subsystem, with the data access subsystem providing encrypted subsystem identification information and encrypted paper transaction data to the data processing subsystem.

51. A system as in claim 1 wherein said one or more data access subsystems also capture electronic transactions from at least one of credit cards and debit cards.

52. A system as in claim 1 further comprising at least one card interface for capturing electronic transaction data.

53. A system as in claim 1 further comprising at least one signature interface for capturing an electronic signature.

54. A system as in claim 1 further comprising at least one biometric interface for capturing biometric data.

55. A system as in claim 1 wherein the system automatically generates at least one of credit card statements, bank statements, and tax reports.

56. A system as in claim 1 wherein said at least one central data processing subsystem polls said one or more remote data access subsystems for transaction data.

57. A system as in claim 1 wherein said transaction data comprises more than one type of transaction data.

58. A system as in claim 1 further comprising at least one data collecting subsystem for collecting and sending electronic transaction data and paper transaction data, the at least one data collecting subsystem further comprising a management subsystem for managing the collecting and sending of the electronic transaction data and the paper transaction data.

59. A system as in claim 1 further comprising at least one data collecting subsystem for collecting and sending at least electronic transaction data, the at least one data collecting subsystem further comprising a management subsystem for managing the collecting and sending of the at least electronic transaction data.

60. A system as in claim 1 further comprising at least one data collecting subsystem for collecting and sending at least the paper transaction data, the at least one data collecting subsystem further comprising a management subsystem for managing the collecting and sending of at least the paper transaction data.

61. A method as in claim 26 further comprising capturing electronic transaction data.

62. A method as in claim 26 further comprising capturing an electronic signature.

63. A method as in claim 26 further comprising capturing biometric data.

64. A method as in claim 26 further comprising automatically generating at least one of credit card statements, bank statements, and tax reports.

65. A method as in claim 26 wherein said transaction data comprises more than one type of transaction data.

66. A method as in claim 26 wherein said capturing and sending occurs at a plurality of remote locations; said collecting, processing, sending and storing occurs at a plurality of central locations; and further comprising:

collecting and sending transaction data at a plurality of intermediate locations;

managing the collecting and sending of the transaction data; and transmitting the transaction data within the intermediate locations and between the intermediate locations and the remote locations and the central locations.

67. A method as in claim 26 wherein said capturing and sending occurs at a plurality of remote locations; said collecting, processing, sending and storing occurs at a plurality of central locations; and further comprising:

collecting and sending the paper transaction data at a plurality of intermediate lcoations;

managing the collecting and sending of the paper transaction data; and transmitting the paper transaction data within the intermediate locations and between the intermediate locations and the remote locations and the central locations.

68. A method as in claim 26 wherein said capturing and sending occurs at a plurality of remote locations; said collecting, processing, sending and storing occurs at a plurality of central locations; and further comprising:

collecting and sending electronic transaction data at a plurality of intermediate locations;

managing the collecting and sending of the electronic transaction data; and transmitting the electronic transaction data within the intermediate locations and between the intermediate locations and the remote locations and the central locations.

69. A method as in claim 26 wherein said capturing and sending occurs at a plurality of remote locations; said collecting, processing, sending and storing occurs at a plurality of central locations; and further comprising:

collecting and sending electronic transaction data and the paper transaction data at a plurality of intermediate locations;

managing the collecting and sending of the electronic transaction data and the paper transaction data; and transmitting the paper transaction data and the electronic transaction data within the intermediate locations and between the intermediate locations and the remote locations and the central locations.

70. A communcation network as in claim 42 wherein said at least one central data processing subsystem automatically generates at least one of credit card statements, bank statements, and tax reports.

71. A communication network as in claim 42 wherein said at least one central data processing subsystem polls said at least one intermediate data collecting subsystem for transaction data.

72. A communication network as in claim 42 wherein the said data comprises more than one type of transaction data.

73. A communication network as in claim 42 wherein said one or more remote data processing subsystems comprise a plurality of remote data processing subsystems and said at least one intermediate data collecting subsystem comprises a plurality of intermediate data collecting subsystems.

74. A communication network as in claim 42 wherein said one or more remote data processing subsystems comprise a plurality of remote data processing subsystems, said at least one intermediate data collecting subsystem comprises a plurality of intermediate data collecting subsystems, and said at least one central subsystem comprises a plurality of central subsystems.

75. A method as in claim 46 further comprising automatically generating at least one of credit card statements, bank statements, and tax reports.

76. A method as in claim 46 further comprising automatically generating credit card statements.

77. A method as in claim 46 further comprising automatically generating bank statements.

78. A method as in claim 46 further comprising automatically generating tax reports.

79. A method as in claim 46 further comprising polling the remote locations.

80. A method as in claim 46 further comprising polling the intermediate locations.

81. A method as in claim 46 wherein said data comprises more than one type of transaction data.

82. A method as in claim 46 wherein said one or more remote subsystems comprise a plurality of remote subsystems and said at least one intermediate subsystem comprises a plurality of intermediate subsystems.

83. A method as in claim 46 wherein said one or more remote subsystems comprise a plurality of remote subsystems, said at least one intermediate subsystem comprises a plurality of intermediate subsystems and said at least one central subsystem comprises a plurality of central subsystems.

84. A communication network for the transmission of data within and between one or more remote data processing subsystems that provide remote data processing subsystem identification information, at least one intermediate data collecting subsystem and at least one central data processing subsystem forming a tiered architecture wherein each of said at least one central data processing subsystem communicate with a corresponding some of said at least one intermediate data collecting subsystem and each of said at least one intermediate data collecting subsystem communicate with a corresponding some of said one or more remote data processing subsystems, said remote data processing subsystem including an imaging subsystem for capturing images of documents and receipts, comprising:

at least one first local area network for transmitting data within a corresponding one of said one or more remote data processing subsystems;

at least one second local area network for transmitting data within a corresponding one of said at least one intermediate data collecting subsystem;

at least one third local area network for transmitting data within a corresponding one of said at least one central data processing subsystem; and at least one wide area network for transmitting data between said one or more remote data processing subsystems, said at least one intermediate data collecting subsystem and said at least one central data processing subsystem.

85. A communication network as in claim 84 further comprising:

at least one first modem for connecting said at least one first local area network of said one or more remote data processing subsystems to a corresponding one of said at least one second local area network through said at least one wide area network;

at least one bank of modems for connecting said at least one second local area network of said at least one intermediate data collecting subsystem to a corresponding some of said at least one first local area network of said one or more remote data processing subsystems through said at least one wide area network;

at least one first wide area network router for connecting a corresponding one of said at least one second local area network of said at least one intermediate data collecting subsystem to said at least one wide area network; and at least one second wide area network router for connecting a corresponding one of said at least one third local area network of said at least one central data processing subsystem to said at least one wide area network.

86. A communication network as in claim 85 wherein said at least one first wide area network and said at least one second wide area network comprise a carrier cloud which utilizes a frame relay method for transmitting the transaction data.

87. A communication network as in claim 86 wherein said at least one second local area network and said at least one third local area network further comprise a corresponding one of at least one network switch for routing data within said at least one second local area network and said at least one third local area network; and further wherein said data comprises at least one of, (a) electronic transactions from credit cards, smart cards and debit cards, signature data or biometric data, and (b) paper transactions from documents and receipts.

88. A method for transmitting data within and between one or more remote subsystems that provide remote subsystem identification information, at least one intermediate subsystem and at least one central subsystem in a tiered manner wherein each of the central subsystems communicate with at least one intermediate subsystem and each of the intermediate subsystems communicate with at least one remote subsystems comprising:

capturing an image of documents and receipts and extracting data therefrom;

transmitting data within remote locations;

transmitting data from each remote location to corresponding intermediate locations;

transmitting data within the intermediate locations;

transmitting data from each intermediate location to corresponding central locations; and transmitting data within the central locations.

89. A method as in claim 88 wherein said transmitting data from each remote location to corresponding intermediate locations step comprises:

connecting each remote location to a corresponding intermediate location; and connecting the intermediate locations to corresponding remote locations.

90. A method as in claim 89 wherein said transmitting data from each intermediate location to corresponding central locations comprises:

connecting each intermediate location to an external communication network; and connecting the corresponding central locations to the external communication network.

91. A method as in claim 90 wherein said transmitting data from each intermediate location to corresponding central locations step further comprises:

packaging the transaction data into frames; and transmitting the frames through the external communication network.

92. A method as in claim 88 wherein said data is obtained from at least one of, (a) electronic transactions from credit cards, smart cards and debit cards, signature data or biometric data, and (b) paper transactions from documents and receipts.

93. A communication network for the transmission of data within and between one or more remote data processing subsystems, at least one intermediate data collecting subsystem and at least one central data processing subsystem forming a tiered architecture wherein each of said at least one central data processing subsystem communicate with a corresponding some of said at least one intermediate data collecting subsystem and each of said at least one intermediate data collecting subsystem communicate with a corresponding some of said one or more remote data processing subsystems, said remote data processing subsystem including an imaging subsystem for capturing images of documents and receipts, comprising:

at least one first local area network for transmitting data within a corresponding one of said one or more remote data processing subsystems;

at least one second local area network for transmitting data within a corresponding one of said at least one intermediate data collecting subsystem;

at least one third local area network for transmitting data within a corresponding one of said at least one central data processing subsystem; and at least one wide area network for transmitting data between said one or more remote data processing subsystems, said at least one intermediate data collecting subsystem and said at least one central data processing subsystem;

wherein the at least one intermediate data collecting subsystem calls the one or more remote data processing subsystems.

94. A communication network as in claim 93 further comprising:

at least one first modem for connecting said at least one first local area network of said one or more remote data processing subsystems to a corresponding one of said at least one second local area network through said at least one wide area network;

at least one bank of modems for connecting said at least one second local area network of said at least one intermediate data collecting subsystem to a corresponding some of said at least one first local area network of said one or more remote data processing subsystems through said at least one wide area network;

at least one first wide area network router for connecting a corresponding one of said at least one second local area network of said at least one intermediate data collecting subsystem to said at least one wide area network; and at least one second wide area network router for connecting a corresponding one of said at least one third local area network of said at least one central subsystem to said at least one wide area network.

95. A communication network as in claim 94 wherein said at least one first wide area network and said at least one second wide area network comprise a carrier cloud which utilizes a frame relay method for transmitting the data.

96. A communication network as in claim 95 wherein said at least one second local area network and said at least one third local area network further comprise a corresponding one of at least one network switch for routing data within said at least one second local area network and said at least one third local area network; and further wherein said data comprises at least one of, (a) electronic transactions from credit cards, smart cards and debit cards, signature data or biometric data, and (b) paper transactions from documents and receipts.

97. A method for transmitting data within and between one or more remote subsystems, at least one intermediate subsystem and at least one central subsystem in a tiered manner wherein each of the central subsystems communicate with at least one intermediate subsystem and each of the intermediate subsystems communicate with at least one remote subsystems comprising:

capturing an image of documents and receipts and extracting data therefrom;

transmitting data within remote locations;

transmitting data from each remote location to corresponding intermediate locations;

transmitting data within the intermediate locations;

the intermediate locations calling the remote locations;

transmitting data from each intermediate location to corresponding central locations; and transmitting data within the central locations.

98. A method as in claim 97 wherein said transmitting data from each remote location to corresponding intermediate locations step comprises:

connecting each remote location to a corresponding intermediate location; and connecting the intermediate locations to corresponding remote locations.

99. A method as in claim 98 wherein said transmitting data from each intermediate location to corresponding central locations comprises:

connecting each intermediate location to an external communication network; and connecting the corresponding central locations to the external communication network.

100. A method as in claim 99 wherein said transmitting data from each intermediate location to corresponding central locations further comprises:

packaging the data into frames; and transmitting the frames through the external communication network.

101. A method as in claim 97 wherein said data is obtained from at least one of, (a) electronic transactions from credit cards, smart cards and debit cards, signature data or biometric data, and (b) paper transactions from documents and receipts.

102. A communication network for the transmission of data comprising data from credit card transactions within and between one or more remote data processing subsystems, at least one intermediate data collecting subsystem and at least one central data processing subsystem forming a tiered architecture wherein each of said at least one central data processing subsystem communicate with a corresponding some of said at least one intermediate data collecting subsystem and each of said at least one data collecting subsystem communicate with a corresponding some of said one or more remote data processing subsystems, said remote data processing subsystem including an imaging subsystem for capturing images of documents and receipts, comprising:

at least one first local area network that transmits data comprising data from credit card transactions within a corresponding one of said one or more remote data processing subsystems;

at least one second local area network that transmits data comprising data from credit card transactions within a corresponding one of said at least one intermediate data collecting subsystem;

at least one third local area network that transmits data comprising data from credit card transactions within a corresponding one of said at least one central data processing subsystem; and at least one wide area network that transmits data comprising data from credit card transactions between said one or more remote data processing subsystems, said at least one intermediate data collecting subsystem and said at least one central data processing subsystem.

103. A communication network as in claim 102 further comprising:

at least one first modem for connecting said at least one first local area network of said one or more remote data processing subsystems to a corresponding one of said at least one second local area network through said at least one wide area network;

at least one bank of modems for connecting said at least one second local area network of said at least one intermediate subsystem to a corresponding some of said at least one first local area network of said one or more remote data processing subsystems through said at least one wide area network;

at least one first wide area network router for connecting a corresponding one of said at least one second local area network of said at least one intermediate data collecting subsystem to said at least one wide area network; and at least one second wide area network router for connecting a corresponding one of said at least one third local area network of said at least one central data processing subsystem to said at least one wide area network.

104. A communication network as in claim 103 wherein said at least one first wide area network and said at least one second wide area network comprise a carrier cloud which utilizes a frame relay method for transmitting the data.

105. A communication network as in claim 104 wherein said at least one second local area network and said at least one third local area network further comprise a corresponding one of at least one network switch for routing data within said at least one second local area network and said at least one third local area network; and wherein said transmitted data further comprises data from at least one of, (a) electronic transactions from smart cards and debit cards, signature data or biometric data, or (b) paper transactions from documents and receipts.

106. A method for transmitting data comprising data from credit card transactions within and between one or more remote subsystems, at least one intermediate subsystem and at least one central subsystem in a tiered manner wherein each of the central subsystems communicate with at least one intermediate subsystem and each of the intermediate subsystems communicate with at least one remote subsystems, comprising:

capturing an image of documents and receipts and extracting data comprising data from credit card transactions therefrom;

transmitting data comprising data from credit card transactions within remote locations;

transmitting data comprising data from credit card transactions from each remote location to corresponding intermediate locations;

transmitting data comprising data from credit card transactions within the intermediate locations;

transmitting data comprising data from credit card transactions from each intermediate location to corresponding central locations; and transmitting data comprising data from credit card transactions within the central locations.

107. A method as in claim 106 wherein said transmitting data from each remote location to corresponding intermediate locations step comprises:

connecting each remote location to a corresponding intermediate location; and connecting the intermediate locations to corresponding remote locations.

108. A method as in claim 107 wherein said transmitting data from each intermediate location to corresponding central locations comprises:

connecting each intermediate location to an external communication network; and connecting the corresponding central locations to the external communication network.

109. A method as in claim 108 wherein said transmitting data from each intermediate location to corresponding central locations step further comprises:

packaging the data into frames; and transmitting the frames through the external communication network.

110. A communication network for the transmission of data comprising data from internet transactions within and between one or more remote data processing subsystems, at least one intermediate data collecting subsystem and at least one central data processing subsystem forming a tiered architecture wherein each of said at least one central data processing subsystem communicate with a corresponding some of said at least one intermediate data collecting subsystem and each of said at least one intermediate data collecting subsystem communicate with a corresponding some of said one or more remote data processing subsystems, said remote data processing subsystem including an imaging subsystem for capturing images of documents and receipts, comprising:

at least one first local area network that transmits data comprising data from internet transactions within a corresponding one of said one or more remote data processing subsystems;

at least one second local area network that transmits data comprising data from internet transactions within a corresponding one of said at least one intermediate data collecting subsystem;

at least one third local area network that transmits data comprising data from internet transactions within a corresponding one of said at least one central data processing subsystem; and at least one wide area network that transmits data comprising data from internet transactions between said one or more remote data processing subsystems, said at least one intermediate data collecting subsystem and said at least one central data processing subsystem.

111. A communication network as in claim 110 further comprising:

at least one first modem for connecting said at least one first local area network of said one or more remote data processing subsystems to a corresponding one of said at least one second local area network through said at least one wide area network;

at least one bank of modems for connecting said at least one second local area network of said at least one intermediate data collecting subsystem to a corresponding some of said at least one first local area network of said one or more remote data processing subsystems through said at least one wide area network;

at least one first wide area network router for connecting a corresponding one of said at least one second local area network of said at least one intermediate data collecting subsystem to said at least one wide area network; and at least one second wide area network router for connecting a corresponding one of said at least one third local area network of said at least one central data processing subsystem to said at least one wide area network.

112. A communication network as in claim 111 wherein said at least one first wide area network and said at least one second wide area network comprise a carrier cloud which utilizes a frame relay method for transmitting the data.

113. A communication network as in claim 112 wherein said at least one second local area network and said at least one third local area network further comprise a corresponding one of at least one network switch for routing data within said at least one second local area network and said at least one third local area network; and wherein said transmitted data further comprises data from at least one of, (a) electronic transactions from credit cards, smart cards and debit cards, signature data or biometric data, and (b) paper transactions from documents and receipts.

114. A method for transmitting data comprising data from internet transactions within and between one or more remote subsystems, at least one intermediate subsystem and at least one central subsystem in a tiered manner wherein each of the central subsystems communicate with at least one intermediate subsystem and each of the intermediate subsystems communicate with at least one remote subsystems comprising:

capturing an image of documents and receipts and extracting data comprising data from internet transactions therefrom;

transmitting data comprising data from internet transactions within remote locations;

transmitting data comprising data from internet transactions from each remote location to corresponding intermediate locations;

transmitting data comprising data from internet transactions within the intermediate locations;

transmitting data comprising data from internet transactions from each intermediate location to corresponding central locations; and transmitting data comprising data from internet transactions within the central locations.

115. A method as in claim 114 wherein said transmitting data from each remote location to corresponding intermediate locations comprises:

connecting each remote location to a corresponding intermediate location; and connecting the intermediate locations to corresponding remote locations.

116. A method as in claim 115 wherein said transmitting data from each intermediate location to corresponding central locations comprises:

connecting each intermediate location to an external communication network; and connecting the corresponding central locations to the external communication network.

117. A method as in claim 116 wherein said transmitting data from each intermediate location to corresponding central locations step further comprises:

packaging the data into frames; and transmitting the frames through the external communication network.

118. A communication network for the transmission of data in a secure manner comprising:

at least one remote data processing subsystem;

at least one intermediate data collecting subsystem;

at least one central data processing subsystem;

said at least one remote data processing subsystem, said at least one intermediate data collecting subsystem, and said at least one central data processing subsystem forming a tiered architecture;

said data being transmitted in a secure manner within and between said at least one remote data processing subsystem, said at least one intermediate data collecting subsystem, and said at least one central data processing subsystem;

wherein each of said at least one central data processing subsystem communicate with a corresponding some of said at least one intermediate data collecting subsystem and each of said at least one intermediate data collecting subsystem communicate with a corresponding some of said at least one remote data processing subsystem;

said remote data processing subsystem including an imaging subsystem for capturing images of documents and receipts;

said communication network further including:
at least one first local area network for transmitting data within a corresponding one of said at least one remote data processing subsystem;
at least one second local area network for transmitting data within a corresponding one of said at least one intermediate data collecting subsystem;
at least one third local area network for transmitting data within a corresponding one of said at least one central data processing subsystem; and
at least one wide area network for transmitting data between said at least one remote data processing subsystem, said at least one intermediate data collecting subsystem and said at least one central data processing subsystem.

119. A communication network as in claim 118 wherein said at least one remote data processing subsystem uniquely identifies the remote data processing subsystem used by a customer.

120. A communication network as in claim 118 wherein said at least one remote data processing subsystem uniquely identifies the remote data processing subsystem used by a customer and at least one of, encrypts and tags the data.

121. A method for transmitting data in a secure manner within and between at least one remote subsystem, at least one intermediate subsystem and at least one central subsystem, said method comprising:

arranging said at least one remote subsystem, said at least one intermediate subsystem, and said at least one central subsystem in a tiered manner;

each of said at least one central subsystem communicating with said at least one intermediate subsystem;

each of said at least one intermediate subsystem communicating with said at least one remote subsystem;

capturing an image of documents and receipts and extracting data therefrom;

transmitting data within remote locations;

transmitting data from each remote location to corresponding intermediate locations;

transmitting data within the intermediate locations;

transmitting data from each intermediate location to corresponding central locations; and transmitting data within the central locations.

122. The method as in claim 121 further comprising uniquely identifying the at least one remote subsystem used by a customer.

123. The method as in claim 121 further comprising:

uniquely identifying the at least one remote subsystem used by a customer; and at least one of, encrypting and tagging data.

* * * * *